US009091984B2

(12) United States Patent
Ono et al.

(10) Patent No.: US 9,091,984 B2
(45) Date of Patent: Jul. 28, 2015

(54) IMAGE FORMING APPARATUS AND COMPUTER READABLE MEDIUM

(75) Inventors: Masafumi Ono, Kanagawa (JP); Masayuki Isogai, Tokyo (JP); Shinichi Kinoshita, Kanagawa (JP); Hidenobu Kanda, Tokyo (JP); Keita Kumokiri, Kanagawa (JP); Yohei Hirota, Kanagawa (JP); Kazuo Fukawa, Kanagawa (JP); Hiroyuki Tanaka, Kanagawa (JP); Sakae Okazaki, Kanagawa (JP); Kenji Kuroishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 355 days.

(21) Appl. No.: 13/194,336

(22) Filed: Jul. 29, 2011

(65) Prior Publication Data
US 2012/0182567 A1 Jul. 19, 2012

(30) Foreign Application Priority Data

Jan. 14, 2011 (JP) ................................. 2011-005791

(51) Int. Cl.
*G03G 15/00* (2006.01)
*H04N 1/00* (2006.01)

(52) U.S. Cl.
CPC ....... *G03G 15/5004* (2013.01); *H04N 1/00896* (2013.01); *H04N 1/00928* (2013.01); *H04N 1/00891* (2013.01); *H04N 1/00904* (2013.01); *H04N 2201/0094* (2013.01)

(58) Field of Classification Search
None
See application file for complete search history.

(56) References Cited

U.S. PATENT DOCUMENTS

| 2003/0052926 | A1* | 3/2003 | Dunlap et al. ................ 345/841 |
| 2004/0042028 | A1* | 3/2004 | Mitsudomi ................... 358/1.14 |
| 2006/0114281 | A1* | 6/2006 | Otsuki ............................ 347/19 |
| 2006/0198646 | A1* | 9/2006 | Funabiki et al. ................ 399/45 |
| 2011/0123243 | A1* | 5/2011 | Fujii .............................. 400/76 |

FOREIGN PATENT DOCUMENTS

| JP | 10010928 | * | 1/1998 |
| JP | 2003233276 | * | 8/2003 |
| JP | 2007030274 A | | 2/2007 |

(Continued)

OTHER PUBLICATIONS

Communication dated Sep. 9, 2014 from the Japanese Patent Office in counterpart application No. 2011-005791.

(Continued)

*Primary Examiner* — Fan Zhang
(74) *Attorney, Agent, or Firm* — Sughrue Mion, PLLC

(57) ABSTRACT

An image forming apparatus includes the following elements. An apparatus body implements plural functions including an image reading function, an image forming function, and a display function in accordance with operations requested by a user. A controller controls first, second, and third power states. An obtaining unit obtains information concerning paper. A first control unit controls the plural functions so that, when the plural functions are returned from the third to the second power state, the display function is returned to the second power state without being synchronized with the other functions and an operation requested by the user is received before the other functions are returned to the second power state. A second control unit controls the other functions so that, if the image forming function is required for executing an operation requested by the user, the operation is executed after the obtaining unit obtains the information concerning paper.

8 Claims, 12 Drawing Sheets

(56) References Cited

FOREIGN PATENT DOCUMENTS

| JP | 2009-023252 A | 2/2009 |
| JP | 2010-54563 A | 3/2010 |

OTHER PUBLICATIONS

Communication from Japan Patent Office issued May 12, 2015 in counterpart Japanese Patent Application No. 2011-005791.

* cited by examiner

IMAGE FORMING APPARATUS AND COMPUTER READABLE MEDIUM

CROSS-REFERENCE TO RELATED APPLICATIONS

This application is based on and claims priority under 35 USC 119 from Japanese Patent Application No. 2011-005791 filed Jan. 14, 2011.

BACKGROUND (i) Technical Field

The present invention relates to image forming apparatuses and computer readable media.

SUMMARY

According to an aspect of the invention, there is provided an image forming apparatus including: an apparatus body that implements plural functions in accordance with operations requested by a user by using an operation unit, the plural functions including an image reading function of reading an image of a document, an image forming function of forming an image, and a display function of displaying content of information provided for the user; a controller that controls a first power state, a second power state, and a third power state, the first power state being a state in which one of the plural functions is being performed, the second power state being a state in which one of the plural functions is ready to be performed, the third power state being a state in which there is no power to perform any of the plural functions or the third power state being a state in which power is lower than power in the first power state or the second power state; an obtaining unit that obtains information concerning paper to be supplied when the image forming function is implemented in the apparatus body; a first control unit that controls the plural functions so that, when the plural functions are to be returned from the third power state to the second power state, the display function is returned to the second power state without being synchronized with the functions other than the display function and an operation requested by the user by using the operation unit of the apparatus body is received before the functions other than the display function are returned to the second power state; and a second control unit that controls the functions other than the display function so that, if the image forming function is required for executing an operation which has been requested by the user by using the operation unit and which has been received under the control of the first control unit, the operation is executed after the obtaining unit obtains the information concerning paper.

BRIEF DESCRIPTION OF THE DRAWINGS

Exemplary embodiments of the present invention will be described in detail based on the following figures, wherein.

DETAILED DESCRIPTION

Exemplary embodiments of the invention will be described below in detail with reference to the accompanying drawings.

Figure 1:
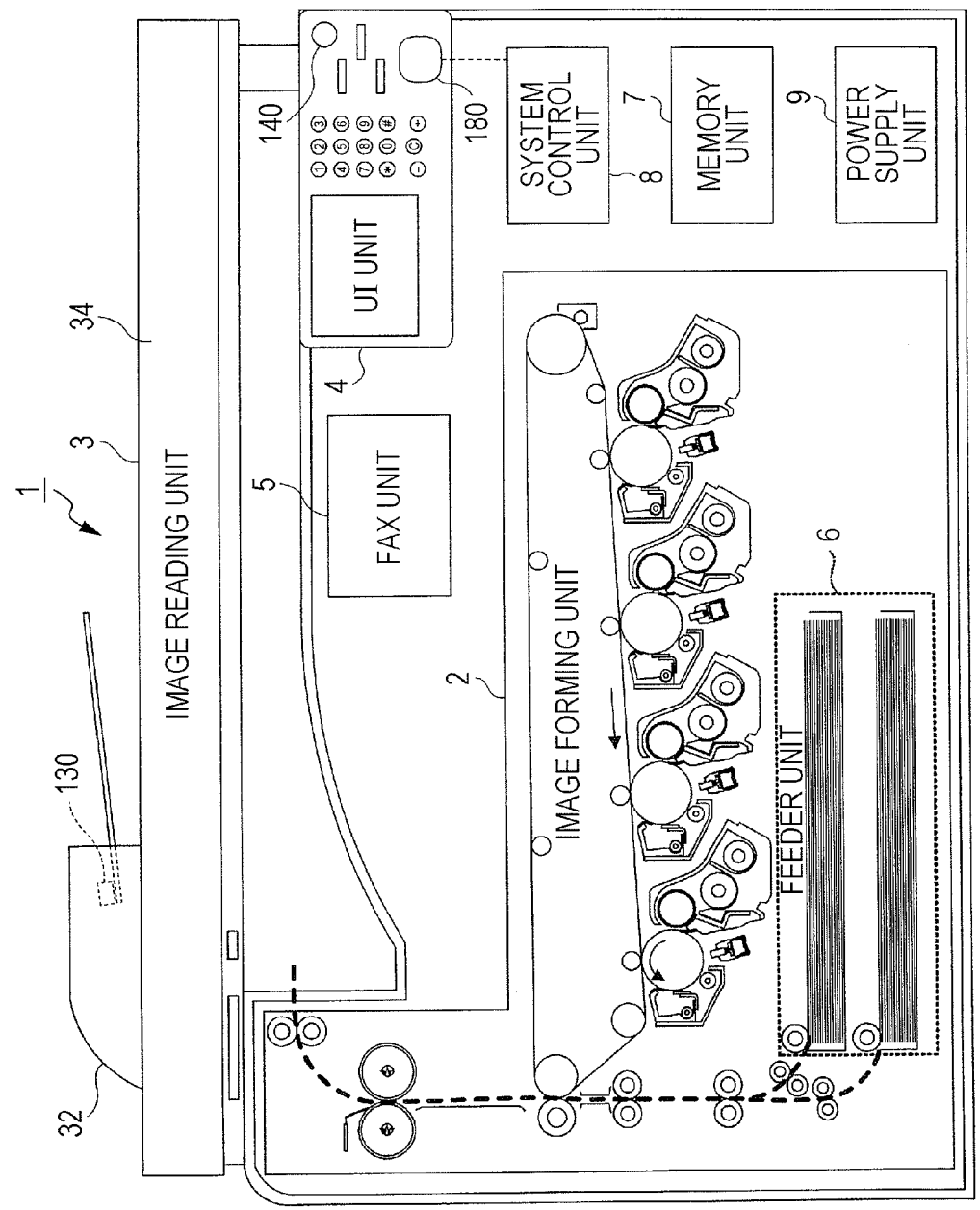
FIG. 1 illustrates an example of the entire configuration of an image forming apparatus according to an exemplary embodiment.

FIG. 1 illustrates an example of the entire configuration of an image forming apparatus 1 according to an exemplary embodiment of the present invention. The image forming apparatus 1 shown in FIG. 1, which serves as an example of an apparatus body, includes an image forming unit 2 and an image reading unit 3. The image forming unit 2 forms images on the basis of image data of corresponding colors (image information). The image reading unit 3 reads an image formed on a document so as to generate image data and sends the generated image data to the image forming unit 2. The image forming unit 2 prints stored images, and the image reading unit 3 performs reading in accordance with the color mode and the resolution specified by a user. The image reading unit 3 includes au auto document feeder (ADF) 32 and a platen cover 34 that covers platen glass.

The image forming apparatus 1 also includes a user interface (UI) unit 4 and a facsimile (FAX) unit 5. The UI unit 4 receives operations input from a user and displays various types of information for a user. The FAX unit 5 sends and receives image information via, for example, a public switched telephone network.

The image forming apparatus 1 also includes a feeder unit 6 and a memory unit 7, which serves as an external storage device. The feeder unit 6 is disposed within the housing of the image forming unit 2 or is attached to the image forming unit 2 as an external device so as to supply paper to the image forming unit 2. The image forming apparatus 1 also includes a system control unit 8 and a power supply unit 9. The system control unit 8 controls the entire operation of the image forming apparatus 1 or communication performed via a communication line. The power supply unit 9 supplies power to the individual components of the image forming apparatus 1.

Figure 2:
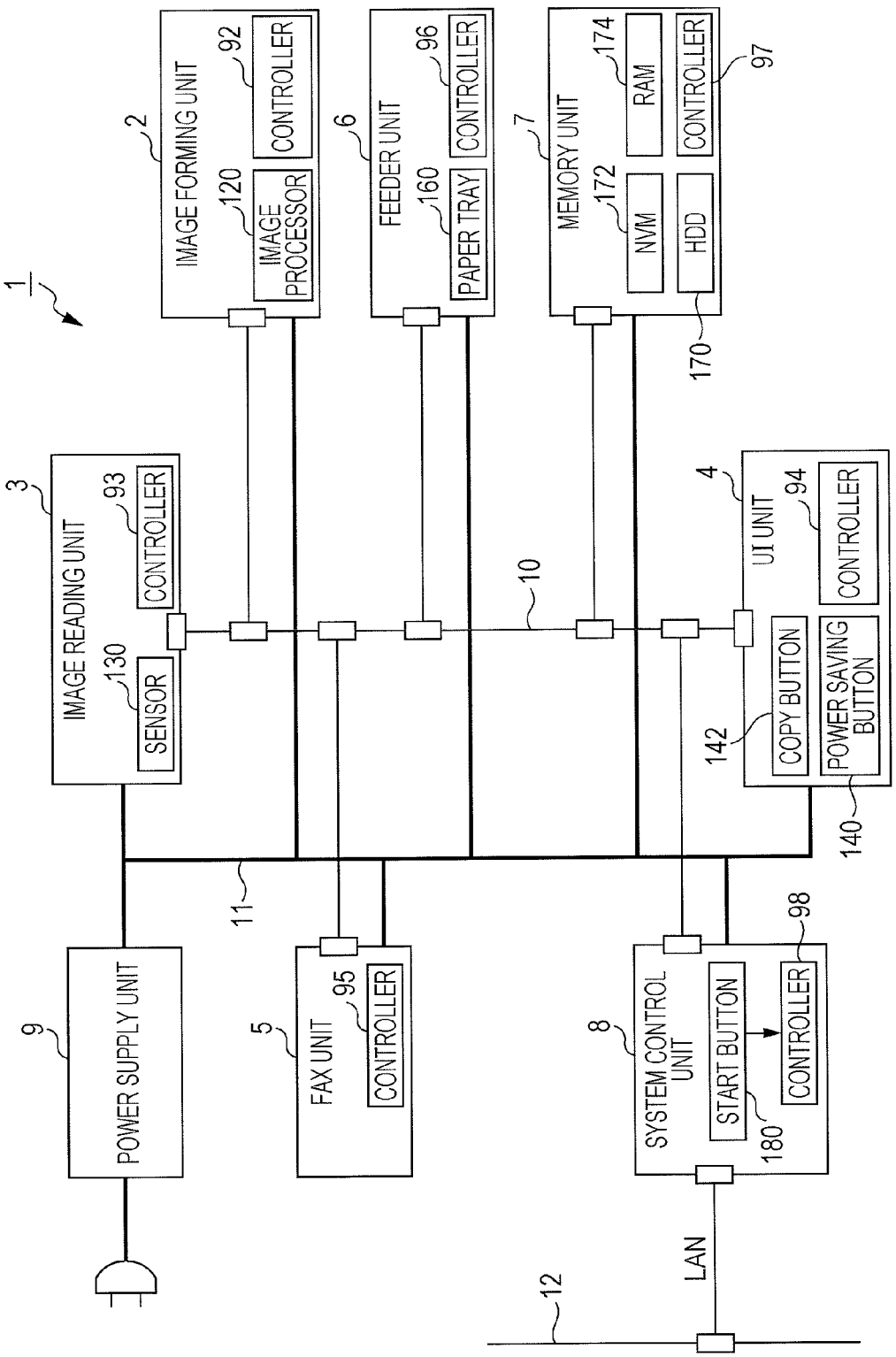
FIG. 2 illustrates an example of the functional configuration of the image forming apparatus shown in FIG. 1.

FIG. 2 illustrates the functional configuration of the image forming apparatus 1 shown in FIG. 1. In this exemplary embodiment, the image forming unit 2, the image reading unit 3, the UI unit 4, the FAX unit 5, the feeder unit 6, the memory unit 7, and the system control unit 8 are connected to an internal local area network (LAN) 10, which serves as an example of an internal communication unit. In this exemplary embodiment, the above-described units, which serve as control functions or an image forming function, are connected to one another via a single bus (internal LAN 10) so as to perform communication among the units. In this respect, the image forming apparatus 1 of this exemplary embodiment is different from the related art. That is, in the related art, units of an image forming apparatus are connected to one another via different control buses in order to perform communication.

In this exemplary embodiment, the units of the image forming apparatus 1 are connected to external devices by using an external LAN 12 via the system control unit 8.

Each unit is provided with a controller for determining the state of power supply (ON or OFF) and for controlling as to whether power is to be supplied or stopped. Details of determination and control for power supply will be discussed later. The controllers will be described more specifically below. An image forming controller 92 is provided for the image forming unit 2. An image reading controller 93 is provided for the image reading unit 3. a UI controller 94 is provided for the UI unit 4. A FAX controller 95 is provided for the FAX unit 5. A feeder controller 96 is provided for the feeder unit 6. A memory controller 97 is provided for the memory unit 7. A system control unit controller 98 is provided for the system control unit 8.

The above-described controllers may be formed by central processing units (CPUs) or application specific integrated circuits (ASICs).

The image forming unit 2 is also provided with an image processor 120 that performs image processing, such as enlarging/reducing, compressing/non-compressing, and editing of images, adjusting the image quality, etc.

The image reading unit 3 is provided with a document detection sensor 130, which serves as an example of a document ready detector, configured to detect that a document (to be copied) has been set in the document feeder (ADF) 32 (see FIG. 1) by a user. The UI unit 4 is provided with a power saving button 140 that allows a user to change the power mode. Details of the power modes will be discussed later. By use of the power saving button 140, the user is able to give an instruction to shift to or return from the power saving mode. The UI unit 4 is also provided with a copy button 142 and other buttons (not shown), such as a scanner button and a fax button. A transparent touch panel may be disposed on the screen that displays images, and the above-described buttons may be provided on the transparent touch panel.

The document detection sensor 130 may be configured to detect that a document has been set by a user when the platen cover 34 is opened and closed. In this case, such a detection mechanism serves as an example of the document ready detector.

The feeder unit 6 is provided with a paper tray 160. Size information concerning the size of paper contained in the paper tray 160 is sent from the feeder controller 96 to the image forming unit 2 and the UI unit 4 via the internal LAN 10. With this arrangement, the image forming unit 2 and the UI unit 4 obtain size information. The paper tray 160 provided in the feeder unit 6 is an example of a feeder. The image forming unit 2 and the UI unit 4 are examples of an obtaining unit. The size information is an example of information concerning paper.

The memory unit 7 is provided with a hard disk drive (HDD) 170, which serves as a first storage medium that includes a rotary mechanism and is rotated by the rotary mechanism so as to store images, a non-volatile memory (NVM) 172, which serves as a second storage medium without having a rotary mechanism, and a random access memory (RAM) 174, which is used as a work area for images that have not been stored in the HDD 170 or that have not been processed in the image processor 120. The HDD 170 is a storage device in which a disk coated with a magnetic material is driven to be rotated and data is read or written from or into the disk with use of a magnetic head. The NVM 172 is a storage device which is rewritable and can retain data even after power is OFF. The NVM 172 may be a flash memory or an electrically erasable and programmable read only memory (EEPROM). The NVM 172 is used for storing information which is set by the system (storing parameters for the units of the image forming apparatus 1, etc.) or for storing the frame area size. The parameters are examples of information used for implementing plural functions, and the NVM 172 is an example of an information storage unit for storing such information.

The system control unit 8 is provided with a start button 180, which is an example of an operation unit provided for the apparatus body of the image forming apparatus 1. The operation unit (start button 180) is operated by the user so as to output a signal for serving as an image forming function. The start button 180 is connected to the system control unit controller 98 via a hot line. That is, the start button 180 is a key for directly requesting the system control unit controller 98 to execute processing concerning system control. That is, the start button 180 can be considered as a function similar to a hotkey.

A power line 11 is connected to the image forming unit 2, the image reading unit 3, the UI unit 4, the FAX unit 5, the feeder unit 6, the memory unit 7, and the system control unit 8. Power is supplied to those units via the power supply unit 9 connected to the power line 11. The power supply unit 9 constantly supplies power of a predetermined voltage (24 V) as an uninterruptible power supply.

The image forming unit 2, which serves as an image forming function, and the image reading unit 3, the UI unit 4, the FAX unit 5, the feeder unit 6, the memory unit 7, and the system control unit 8, all of which serve as corresponding control functions, are configured to individually control power modes, for example as follows, (i) the power OFF mode during the system sleep, (ii) the power ON (5 V) mode in the standby state, and (iii) the power ON (24 V) mode in the job execution state. The above-described units (the image forming function and the individual control functions) control the power modes as follows. The image forming function and the individual control functions determine the states of the corresponding systems or appropriately determine the lapse of time after a certain operation has been performed so as to change the power mode. More specifically, the image forming controller 92, the image reading controller 93, the UI controller 94, the FAX controller 95, the feeder controller 96, the memory controller 97, and the system control unit controller 98 determine on their own the states of power supply (ON or OFF) from information obtained via the internal LAN 10, which serves as an internal communication unit, so as to control on their own as to whether power from the power supply unit 9 is to be supplied or stopped. Thus, the image forming controller 92, the image reading controller 93, the UI controller 94, the FAX controller 95, the feeder controller 96, the memory controller 97, and the system control unit controller 98 also each serve as an information obtaining unit that obtains information sent via the internal LAN 10.

It is noted that supplying/stopping of power is controlled among the individual units, and also, among the components (devices) of the individual units. That is, the devices forming the individual units are connected to a unit LAN. The controllers provided for the individual units determine the states of power supply (ON or OFF) to the units so as to allow the individual units to control on their own as to whether power is to be supplied or stopped.

The image forming unit 2, the image reading unit 3, and the FAX unit 5 can determine on their own the transition among a power OFF state, which serves as a third power state, a power ON (5 V) state, which serves as a second power state, and a power ON (24 V) state, which serves as a first power state. The UI unit 4 can determine on its own the transition among a power OFF state, which serves as the third power state, a light emitting diode (LED) OFF state, which serves as a second power state, and a power ON (24 V) state, which serve as a first power state.

The system control unit 8 can determine on its own the transition among a power OFF state, which serves as a third power state, a CPU OFF state, which serves as a fourth power state, a power ON (5 V) state, which serves as a second power state, a power ON (24 V) state, which serves as a first power state. The CPU OFF state is a state in which the CPU is turned OFF during the standby mode.

The power modes will be discussed more specifically below.

Description of Each Unit

Supplying/stopping of power control operations performed in each unit will be described below by taking the image forming unit 2 as a typical example.

Figure 3:
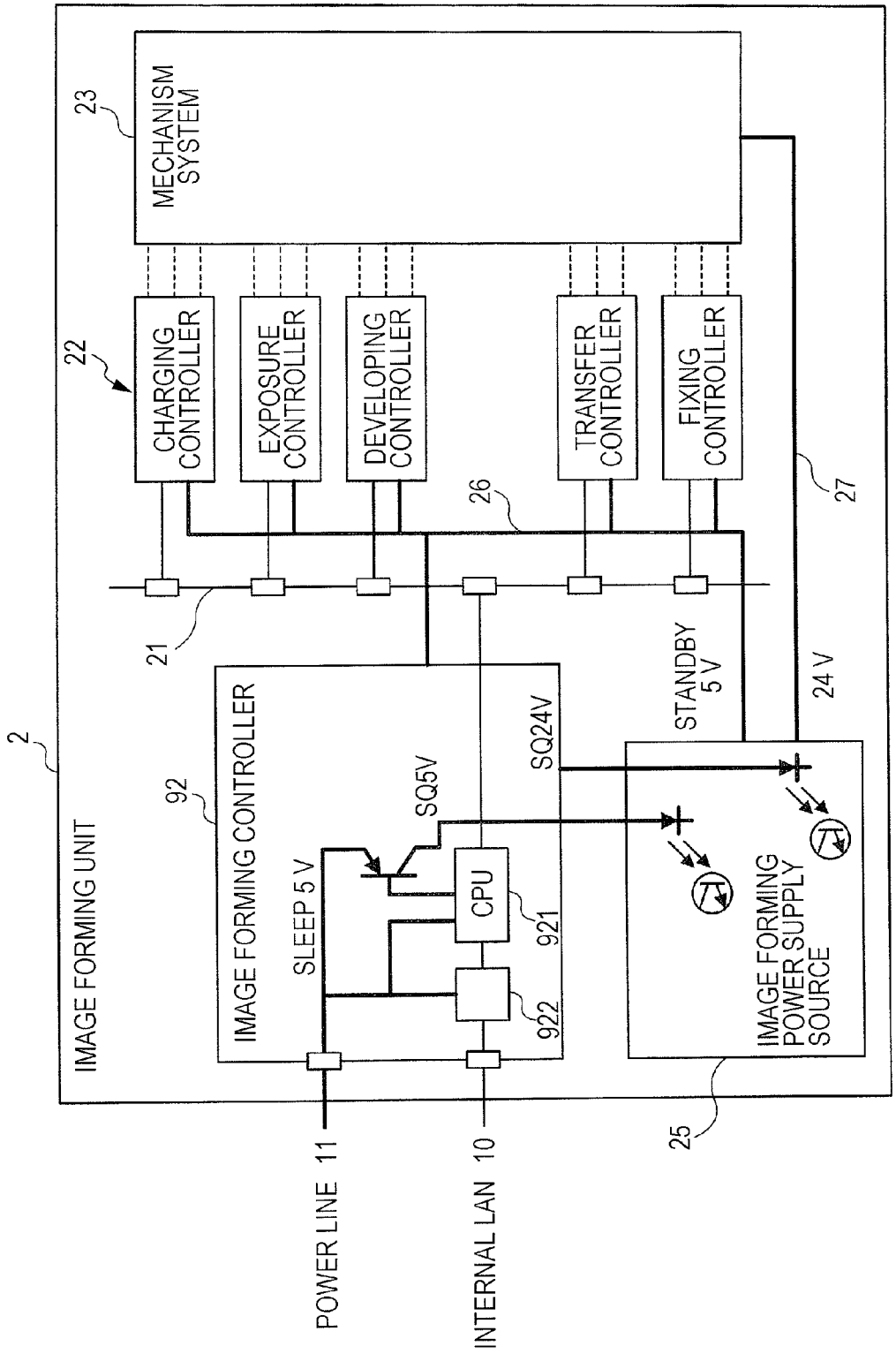
FIG. 3 illustrates an example of the functional configuration of an image forming unit.

FIG. 3 illustrates the functional configuration of the image forming unit 2. The image forming unit 2, which serves as the image forming function, performs image forming processing on the basis of image data of individual colors. In the image forming unit 2 shown in FIG. 3, various controllers 22, which serve as controllers for individual devices forming the image forming unit 2, are connected to a unit LAN 21. The various controllers 22 include a charging controller, an exposure controller, a developing controller, a transfer controller, and a fixing controller, which control electrophotographic-system image forming processing. The various controllers 22 control various mechanisms (devices) of a mechanism system 23. More specifically, the various controllers 22 control operations of a motor, a solenoid, a clutch, etc., disposed in the mechanism system 23 through use of a mechatronics IN/OUT (I/O). The mechanism system 23 also controls process setting values which are supplied to devices provided in the mechanism system 23, such as to a charger used for charging a photoconductor drum and a laser exposure device used for exposing the photoconductor drum to a laser beam.

Additionally, the image forming controller 92 is connected to the unit LAN 21. The image forming controller 92 includes a CPU 921 for controlling the image forming controller 92 and a command filter 922 connected to the internal LAN 10 so as to filter commands obtained from the internal LAN 10. For example, when information to which a command indicating that processing is to be performed by the image forming unit 2 has been appended is sent by broadcasting via the internal LAN 10, the command filter 922 selects such a command. If uninterruptible power (e.g., 5 V) provided from the power supply unit 9 via the power line 11 is supplied only to the command filter 922 that detects LAN commands, the CPU 921 can be switched OFF during the standby mode, thereby achieving further power saving.

Each unit forming the image forming apparatus 1, such as the image forming unit 2, includes a power supply source for the corresponding unit. An image forming power supply source 25 is provided for the image forming unit 2 shown in FIG. 3 and is operated under the control of the image forming controller 92. In each unit, power is supplied from the corresponding power supply source to the individual controllers. The image forming unit 2 shown in FIG. 3 is provided with a control power line 26 through which standby power (5 V) is supplied from the image forming power supply source 25 to the various controllers 22. The image forming unit 2 is also provided with an operating power line 27 through which operating power (24 V) is supplied from the image forming power source 25 to the mechanism system 23.

Operation for Transition of Power Mode

A description will now be given of operations performed by the image forming function, the control functions, and an integrated control function.

Figure 4:
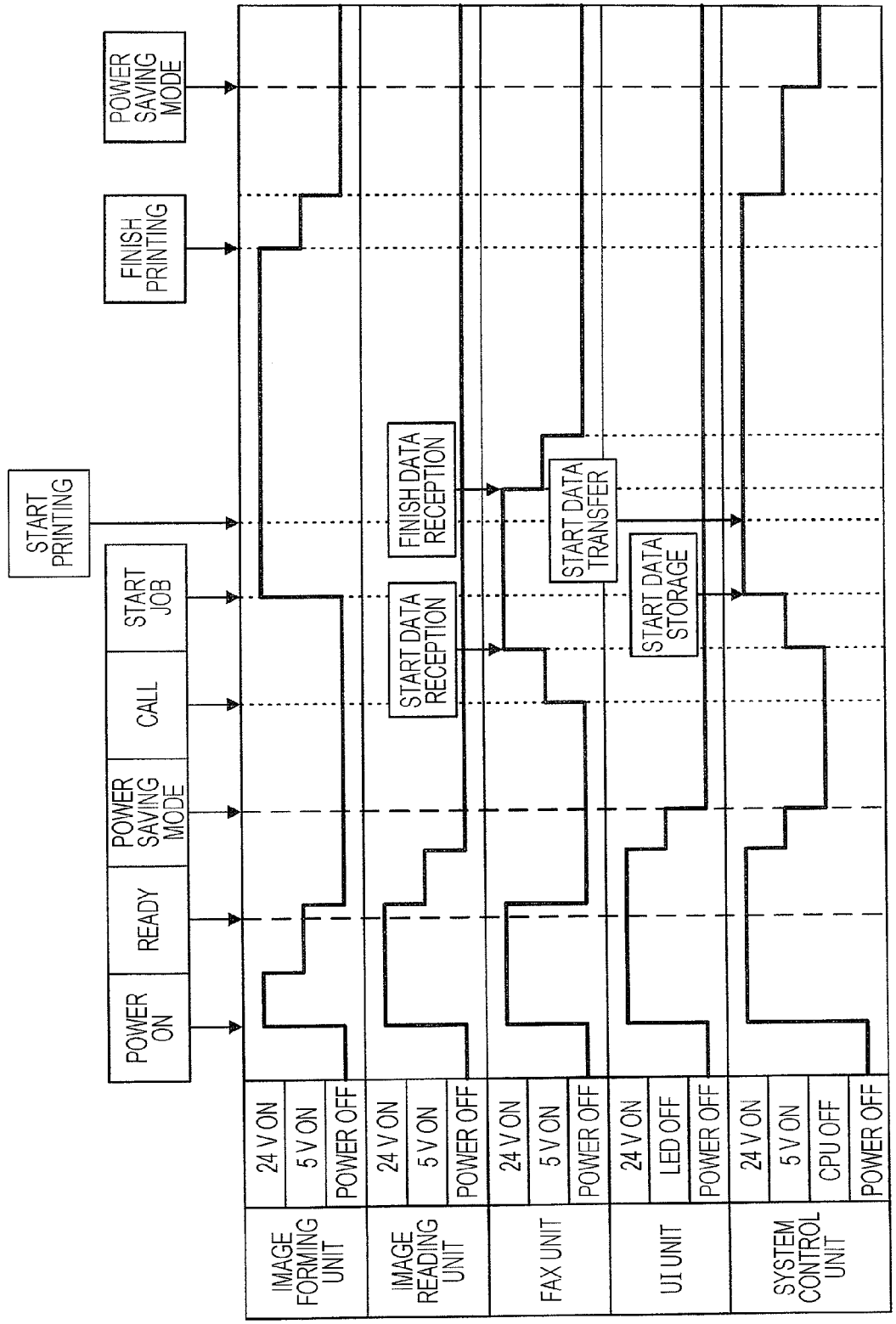
FIG. 4 illustrates a transition state of power modes upon receiving FAX data.
Figure 5:
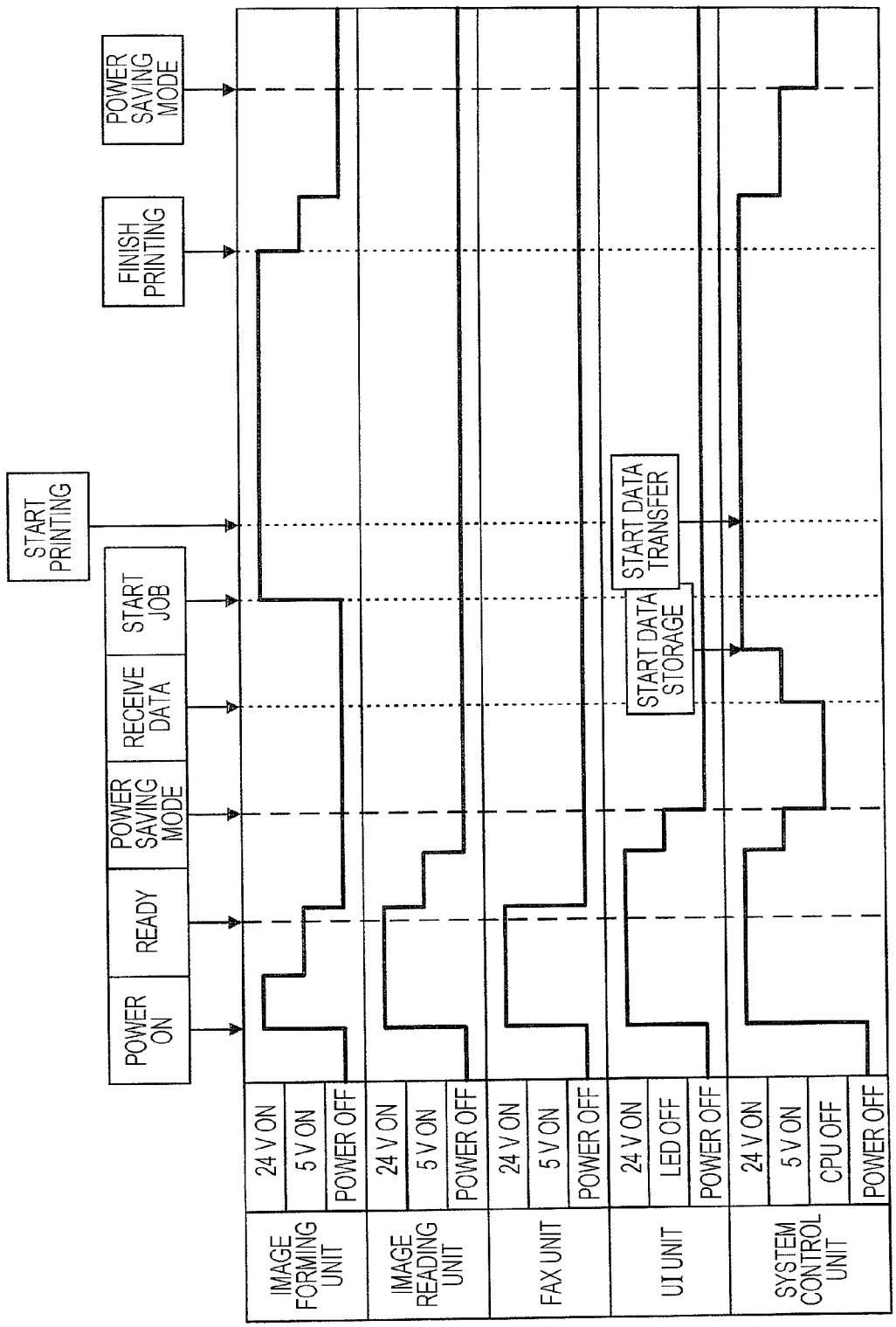
FIG. 5 illustrates a transition state of power modes upon receiving print job data.
Figure 6:
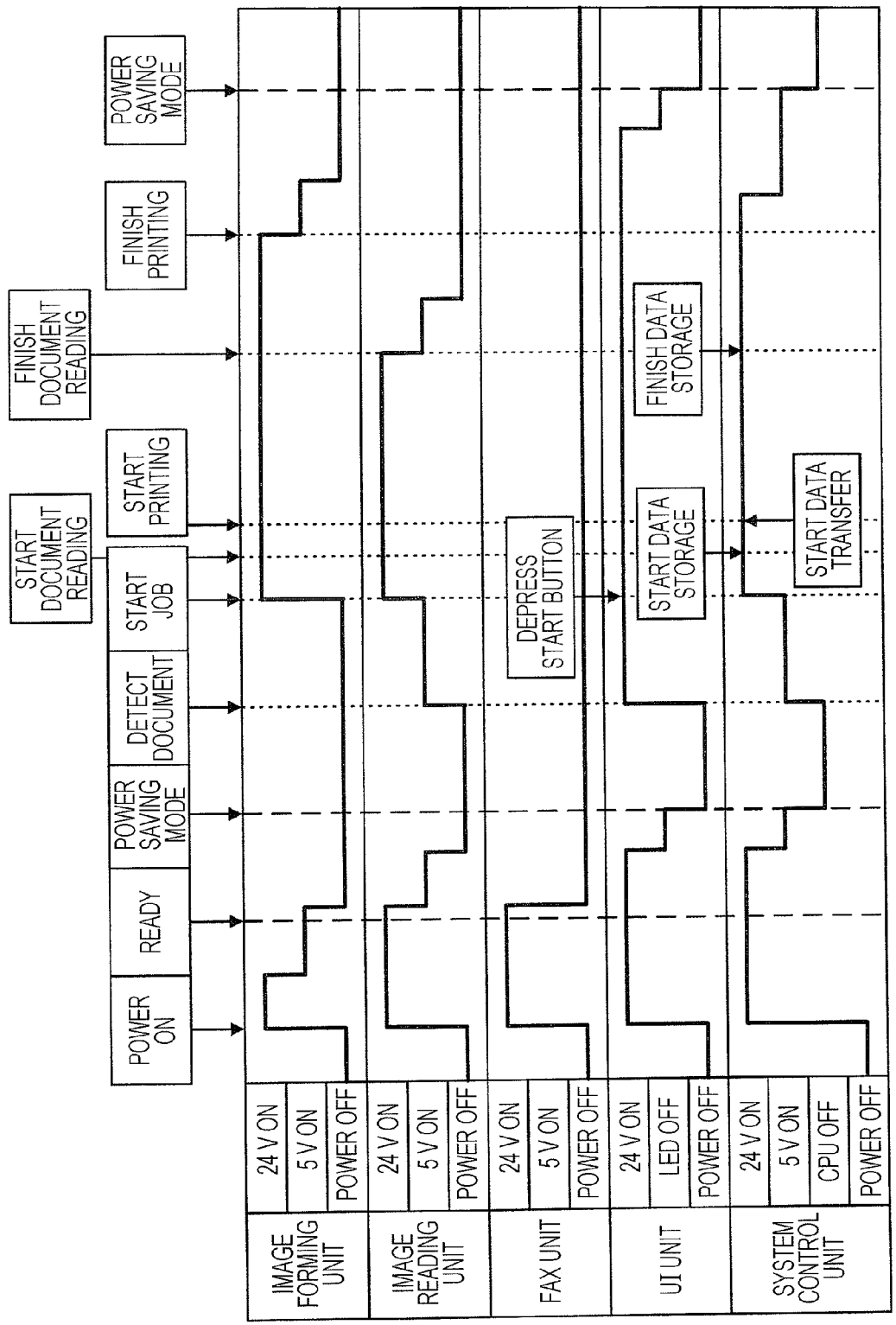
FIG. 6 illustrates a transition state of power modes when performing copying processing.

FIGS. 4 through 6 illustrate transition states among three different modes of the image forming unit 2, the image reading unit 3, the FAX unit 5, the UI unit 4, and the system control unit 8. Each unit determines and changes on its own the power mode, thereby maintaining the power saving state in accordance with the function of the corresponding unit. In this example, the image forming unit 2, the image reading unit 3, and the FAX unit 5 can individually determine on their own the transition among the following three power states: the power OFF state; the power ON (5 V) state; and the power ON (24 V) state. The UI unit 4 can determine on its own the transition of the following three states: the power OFF state; the LED OFF state; and the power ON (24 V) state. The system control unit 8 can determine on its own the transition among the following four states: the power OFF state; the CPU OFF state; the power ON (5 V) state; and the power ON (24 V) state.

Transition of Power Mode Upon Receiving Fax Data

FIG. 4 illustrates a transition state of the power mode upon receiving FAX data.

"POWER ON" shown in FIG. 4 indicates, for example, a state in which the switch of the entire image forming apparatus 1 (main switch) is changed from OFF to ON, which causes each unit to start an initialization operation.

"READY" shown in FIG. 4 indicates a state in which various image processing operations, such as printing, copying, and operations using a FAX and a scanner, are ready to be performed, and the initialization operation of each unit has finished. The image forming unit 2, the image reading unit 3, the FAX unit 5, and the UI unit 4 each perform an initialization operation, and then, send by broadcasting via the internal LAN 10 a command indicating that the corresponding unit has finished the initialization operation and has entered the ready state. The system control unit 8 identifies that the corresponding unit has entered the ready state, and provides, if necessary, information indicating that, for example, the information processing apparatus 1 has entered the ready state to external devices. Units which do not have to start operating immediately after the initialization operation determine on their own to reduce the power level so as to achieve power saving. Units that do not have to operate after the initialization operation enter the non-operating state, thereby maintaining the efficient power saving state.

It is noted that "broadcasting" means to send via the internal LAN 10 information to which a command has been appended to all units connected to the internal LAN 10.

"POWER SAVING MODE" shown in FIG. 3 indicates a state in which the UI unit 4 or the system control unit 8 has entered the saving mode when image information is not input after the lapse of a predetermined time after the corresponding unit has entered the ready state. Such a saving state can be recognized by the user. In this power saving mode, light provided for the panel of the UI unit 4 is also turned OFF (LED OFF state), and the system control unit controller 98 of the system control unit 8 is turned OFF (CPU OFF state). However, in the system control unit 8, a function (ASIC) of monitoring the reception of print job data from an external device via the external LAN 12 or an input of an operation from a user performed on the UI unit 4 is turned ON even during the power saving mode. Upon receiving print job data or an input of an operation from a user, the ASIC changes the system control unit controller 98 from the CPU OFF state to the power ON state (5 V).

The power OFF state of the units other than the system control unit 8 can be changed upon receiving an external interrupt.

This will be described in more detail with reference to FIGS. 2 and 4.

Power is supplied from the power supply unit 9 via the power line 11 so as to cause the image forming apparatus 1 to start, and then, the units perform, if necessary, initialization operations in the power modes corresponding to the functions of the units. In this case, if it is necessary to synchronize the units with each other when performing the initialization operations, the system control unit 8 communicates with the corresponding units in order to obtain required statuses from the units. Basically, however, in this exemplary embodiment, each unit performs its own initialization operation independently. Accordingly, when power is ON, the image forming unit 2, the image reading unit 3, the UI unit 4, the FAX unit 5, and the system control unit 8 shift from the power OFF state to the power ON (24 V) state. Although it is not shown in FIG. 4, the same applies to the feeder unit 6 and the memory unit 7. In this power ON state, each unit performs its own initialization operation. More specifically, each unit performs its own initialization operation under full power and determines on its own to finish the initialization operation after the lapse of a predetermined time, and also determines on its own to reduce the power level to a level which is lower than the full power level after the lapse of a predetermined time after the initialization operation.

That is, the image forming controller 92 of the image forming unit 2 determines on its own to shift the power mode from the power ON (24 V) state to the power ON (5 V) state during the initialization operation on the basis of its own criteria. This is because of the following reason. The image forming unit 2 can finish the initialization operation for the devices provided in the image forming unit 2 in a comparatively short period of time. Accordingly, upon finishing the initialization operation for the devices, the power mode is shifted from the power ON (24 V) state which is necessary for operating all the devices in the image forming unit 2 to the power ON (5 V) state which is necessary for operating the CPU, which is a component that controls the image forming unit 2.

Then, after shifting to the ready state upon completion of the initialization operation, the image forming controller 92 determines on its own to change the power mode from the power ON (5 V) state to the power OFF state in accordance with its own criteria.

Concerning the image reading unit 3, it takes time to perform various types of setting processing for the devices provided in the image reading unit 3 during the initialization operation. Accordingly, the image reading unit 3 finishes the initialization operation in the power ON (24 V) state which is necessary for operating all the devices in the image reading unit 3. Then, after shifting to the ready state upon completion of the initialization operation, the image reading controller 93 of the image reading unit 3 determines on its own to change the power mode from the power ON (24 V) state to the power ON (5 V) state in accordance with its own criteria. With the provision of the power ON (5 V) state, if, during this period, a copying instruction or an image reading instruction is received from a user, the time taken to perform initialization for communication is reduced, thereby making it possible to provide an output to the user more speedily. After the ON (5 V) state, the image reading controller 93 determines on its own to shift to the power OFF state in accordance with its own criteria.

The FAX unit 5 finishes the initialization operation in the power ON (24 V) state. Then, after shifting to the ready state upon completing the initialization operation, the FAX controller 95 of the FAX unit 5 determines on its own to shift from the power ON (24 V) state to the power OFF state without shifting to the power ON (5 V) state in accordance with its own criteria.

Concerning the UI unit 4, upon completion of the initialization operation and even after shifting to the ready state, the UI unit 4 determines on its own to maintain the ON (24 V) state for a period longer than that of the image reading unit 3 or the FAX unit 5 in accordance with its own criteria. This is because of the following reason. In a case in which an instruction, such as a copying instruction, is input from a user, the time required to start the system is reduced so as to start the corresponding operation without any delay. Then, the UI controller 94 determines on its own to temporarily shift to the power ON (5 V) state and further to the power OFF state in accordance with its own criteria.

In a manner similar to the ON state of the UI unit 4, in the system control unit 8, after shifting to the ready state upon completion of the initialization operation, the system control unit controller 98 of the system control unit 8 determines on its own to maintain the power ON (24 V) state for a certain period in accordance with its own criteria. With the provision of this period, it is possible to maintain a state in which processing can be promptly started in response to various instructions, such as an image processing instruction, from a user. Then, the system control unit controller 98 determines on its own to temporarily shift to the power ON (5 V) state and further shifts to the CPU OFF state in accordance with its own criteria.

If the FAX unit 5 detects a call after shifting to the power saving mode, as shown in FIG. 4, the FAX controller 95 of the FAX unit 5 shifts from the power OFF state to the power ON (5 V) state. Then, the FAX controller 95 performs communication negotiation in order to establish communication with a sender regarding information concerning the communication speed, the data format, etc., in order to receive FAX data. Upon completion of communication negotiation, the FAX controller 95 shifts the power ON (5 V) state to the power ON (24 V) state so as to turn ON the mechanism system of the FAX unit 5. Thus, the FAX unit 5 starts receiving FAX data.

Upon starting to receive the FAX data, the FAX controller 95 determines from information obtained from the FAX data whether the FAX data is to be stored in a box provided in the memory unit 7 or whether an image is to be immediately formed in the image forming unit 2. Then, a command corresponding to a result of this determination is sent by broadcasting to the individual units via the internal LAN 10. More specifically, the FAX controller 95 sends by broadcasting a command to store the FAX data in a box provided in the memory unit 7 or a command to form an image in the image forming unit 2 to the other units via the internal LAN 10.

In the example shown in FIG. 4, the FAX controller 95 sends by broadcasting a command to form an image (image forming command) included in the FAX data.

Upon receiving the image forming command by broadcasting via the internal LAN 10, the individual units determine on their own to set the power mode.

More specifically, upon receiving the image forming command from the FAX unit 5, the above-described ASIC causes the system control unit 8 to shift from the CPU OFF state to the power ON (5 V) state. Then, the system control unit controller 98 identifies the image forming command so as to shift the power mode of the system control unit 8 to the power ON (24 V) state. Accordingly, the system control unit 8 starts storing the FAX data (image data) received by the FAX unit 5 in a flash memory provided in the system control unit 8. Along with this, the system control unit controller 98 sends by broadcasting a command (job start command) to start performing image forming processing (job) on the stored FAX data to the other units via the internal LAN 10.

In the image forming unit 2, upon receiving the job start command from the system control unit 8, the image forming controller 92 shifts the power mode of the image forming unit 2 from the power OFF state to the power ON (24 V) state, thereby turning ON the mechanism system 23 (see FIG. 3) of the image forming unit 2 to start the image forming pre-operation (starting the job). More specifically, a warm-up operation for setting up a fixing device included in the mechanism system 23 to be ready for a fixing operation. Upon completion of the warm-up operation of the fixing device, the image forming controller 92 sends by broadcasting a command indicating that the warm-up operation has finished (warm-up completion notification command) to the other units via the internal LAN 10.

In the system control unit 8, upon receiving the warm-up completion notification command, the system control unit controller 98 transfers the stored image data to the image forming unit 2.

The image forming unit 2 then starts forming (printing) an image on the basis of the image data obtained from the system control unit 8.

Although it is not shown in FIG. 4, the feeder unit 6 also starts an operation for feeding paper after a procedure similar to that described above.

In this case, the image forming controller 92 and the feeder controller 96 of the feeder unit 6 send by broadcasting a command indicating that the image forming operation has started (image forming start notification command) to the other units via the internal LAN 10.

In contrast, it is not necessary that the image reading unit 3 perform an operation in response to the image forming command from the FAX unit 5 or the job start command from the system control unit 8. Accordingly, the image reading unit 3 maintains the power mode in the power OFF state.

It is also not necessary that the UI unit 4 perform an operation in response to the image forming command from the FAX unit 5 or the job start command from the system control unit 8. Accordingly, the UI unit 4 maintains the power mode in the power OFF state.

In the image forming unit 2 or in the feeder unit 6 that has started printing, the various controllers 22 provided in the image forming unit 2 or the feeder controller 96 provided in the feeder unit 6 may respectively determine the states of power supply/stop (ON or OFF) for the devices (mechanism system 23) forming the image forming unit 2 or the devices forming the feeder unit 6 and for the controllers themselves, and may control as to whether power is to be supplied or stopped (ON or OFF) for those devices and the controllers themselves.

This will be discussed more specifically by taking the image forming unit 2 as an example. The image forming unit 2 includes, as devices, a charger for charging the photoconductor drum on which toner images of individual colors are formed, a laser exposure device for exposing the photoconductor drum to a laser beam, and a developing device for developing latent images formed on the photoconductor drum. The image forming unit 2 also includes a first transfer device that sequentially transfers the toner images of the individual colors formed on the photoconductor drum onto an intermediate transfer member, a second transfer device that simultaneously transfers the toner images of the individual colors formed on the intermediate transfer member onto paper, and a fixing device for fixing the toner images on the paper. Among those devices, there are many devices that do not have to be constantly operating during the image forming operation. Thus, upon receiving the job start command from the system control unit 8, the various controllers 22 (charging controller, exposure controller, developing controller, a transfer controller, fixing controller, etc.), which serve as the controllers of the individual devices, calculate, for the corresponding devices, times (operation times) at which the corresponding devices are to be operated. Then, the various controllers 22 control, on their own, supplying/stopping of power (ON or OFF) for the corresponding controllers and for the corresponding devices in accordance with the calculated times for the corresponding devices. Thus, power is supplied to the various controllers 22 and the corresponding devices in accordance with the calculated times. As a result, power saving can be achieved in each device.

Referring back to the description of the FAX unit 5, upon completion of receiving the FAX data, the FAX controller 95 shifts the power mode from the power ON (24 V) state to the power ON (5 V) state, thereby turning OFF power supplied to the mechanism device of the FAX unit 5. However, the FAX controller 95 maintains its operating state (5 V) for a predetermined period in order to wait for receiving subsequent FAX data. The FAX controller 95 also sends by broadcasting a command indicating that the reception of FAX data has finished (reception completion notification command) to the other units via the internal LAN 10. Upon receiving the reception completion notification command from the FAX unit 5, the system control unit controller 98 of the system control unit 8 identifies this command, and then completes the processing for storing the FAX data received by the FAX unit 5. However, the system control unit 8 is still required to continue transferring the stored FAX data to the image forming unit 2. The system control unit 8 has also identified from the image forming start notification command from the image forming unit 2 and the feeder unit 6 that the image forming operation is being performed in the image forming unit 2 and the feeder unit 6. Accordingly, the system control unit controller 98 maintains the power ON (24 V) state in order to transfer the FAX data and to monitor the operation of the entire image forming apparatus 1.

Referring back to the description of the image forming unit 2, upon completion of printing by the image forming unit 2, the image forming controller 92 shifts the power mode of the image forming unit 2 from the power ON (24 V) state to the power ON (5 V) state, thereby turning OFF power supplied to the mechanism system 23 of the image forming unit 2. However, the image forming controller 92 maintains its operating state (5 V) for a predetermined period in order to receive various image data including subsequent FAX data. The image forming controller 92 also sends by broadcasting a command indicating that printing has finished (image forming completion notification command) to the other units via the internal LAN 10. Then, if image data is not input after the lapse of a predetermined time, power to the image forming controller 92 is turned OFF, and the image forming unit 2 shifts to the power OFF state.

Although it is not shown in FIG. 4, the same applies to the feeder unit 6.

In the system control unit 8, upon receiving the image forming completion notification command from the image forming unit 2, the system control unit controller 98 maintains the power ON (24 V) state for a predetermined period, and then shifts to the power ON (5 V) state, thereby turning OFF power supplied to the mechanism system of the system control unit 8. However, the system control unit controller 98 maintains its operating state (5 V) for a predetermined period in order to wait for an input of a command received by broadcasting from the individual units via the internal LAN 10. If no command is input from any of the units after the lapse of a predetermined time, the system control unit 8 determines that no image information (various image data) is input into the image forming apparatus 1. Thus, the system control unit controller 98 shifts to the CPU OFF state so as to set the power saving mode.

Transition of Power Mode Upon Receiving Print Job Data

FIG. 5 illustrates a transition state of the power mode upon receiving print job data.

As in the reception of FAX data, upon reception of print job data, the transition of the power mode in the individual units from when the image forming apparatus 1 is started after power is supplied from the power supply unit 9 via the power line 11 until when the image forming apparatus 1 shifts to the power saving mode is similar to that in the case of FAX reception shown in FIG. 4.

After shifting to the power saving mode, as shown in FIG. 5, upon receiving print job data by the system control unit 8 from an external device via the external LAN 12, the above-described ASIC provided for the system control unit 8 shifts the system control unit controller 98 from the CPU OFF state to the power ON (5 V) state. Then, the system control unit controller 98 starts communication negotiation with the external device.

After establishing communication with the external device, the system control unit controller 98 shifts the power mode from the power ON (5 V) state to the power ON (24 V) state, thereby turning ON the mechanism system including the communication mechanism of the system control unit 8. The communication mechanism then starts receiving the print job data and starts storing the print job data in, for example, a flash memory within the system control unit 8.

When a predetermined amount of print job data is stored by the communication mechanism, the system control unit controller 98 sends by broadcasting a command (job start command) to start performing image forming processing (job) on the stored print job data (image data) to the other units via the internal LAN 10.

Upon receiving the job start command via the internal LAN 10, the individual units determine on their own to set the power mode.

More specifically, in the image forming unit 2, upon receiving the job start command from the system control unit 8, the image forming controller 92 shifts the power mode of the image forming unit 2 from the power OFF state to the power ON (24 V) state, thereby turning ON the mechanism system 23 (see FIG. 3) of the image forming unit 2 to start the image forming pre-operation (starting the job). More specifically, a warm-up operation for setting up a fixing device included in the mechanism system 23 to be ready for a fixing operation is started. Upon completion of the warm-up operation of the fixing device, the image forming controller 92 sends by broadcasting a command indicating that the warm-up operation has finished (warm-up completion notification command) to the other units via the internal LAN 10.

In the system control unit 8, upon receiving the warm-up completion notification command from the image forming unit 2, the system control unit controller 98 transfers the stored image data to the image forming unit 2.

The image forming unit 2 then starts forming (printing) an image on the basis of the image data obtained from the system control unit 8.

Although it is not shown in FIG. 4, the feeder unit 6 also starts an operation for feeding paper after a procedure similar to that described above.

In this case, the image forming controller 92 and the feeder controller 96 of the feeder unit 6 send by broadcasting a command indicating that the image forming operation has started (image forming start notification command) to the other units via the internal LAN 10.

In contrast, it is not necessary that the image reading unit 3 perform an operation in response to the job start command from the system control unit 8 or the warm-up completion notification command from the image forming unit 2. Accordingly, the image reading unit 3 maintains the power mode in the power OFF state.

It is also not necessary that the UI unit 4 perform an operation in response to the job start command from the system control unit 8 or the warm-up completion notification command from the image forming unit 2. Accordingly, the UI unit 4 maintains the power mode in the power OFF state.

It is also not necessary that the FAX unit 5 perform an operation in response to the job start command from the system control unit 8 or the warm-up completion notification command from the image forming unit 2. Accordingly, the FAX unit 5 maintains the power mode in the power OFF state.

In the image forming unit 2 or in the feeder unit 6 that has started printing, the various controllers 22 provided for the image forming unit 2 or the feeder controller 96 provided for the feeder unit 6 may respectively determine and control as to whether power is to be supplied or stopped (ON or OFF) for the devices (mechanism system 23) forming the image forming unit 2 or for the devices forming the feeder unit 6 and also determine and control the power mode (ON or OFF) of the controllers.

Upon completion of printing by the image forming unit 2, the image forming controller 92 shifts the power mode of the image forming unit 2 from the power ON (24 V) state to the power ON (5 V) state, thereby turning OFF power supplied to the mechanism system 23 of the image forming unit 2. However, the image forming controller 92 maintains its operating state (5 V) for a predetermined period in order to receive various image data including subsequent print job data. The image forming controller 92 also sends by broadcasting a command indicating that printing has finished (image forming completion notification command) to the other units via the internal LAN 10. Then, if image data is not input after the lapse of a predetermined time, power to the image forming controller 92 is turned OFF, and the image forming unit 2 shifts to the power OFF state.

Although it is not shown in FIG. 5, the same applies to the feeder unit 6.

In the system control unit 8, upon receiving the image forming completion notification command from the image forming unit 2, the system control unit controller 98 maintains the power ON (24 V) state for a predetermined period, and then shifts to the power ON (5 V) state, thereby turning OFF power supplied to the mechanism system of the system control unit 8. However, the system control unit controller 98 maintains its operating state (5 V) for a predetermined period in order to wait for an input of a command received by broadcasting from the individual units via the internal LAN 10. If no command is input from any of the units after the lapse of a predetermined time, the system control unit 8 determines that no image information (various image data) is input into the image forming apparatus 1. Thus, the system control unit controller 98 shifts to the CPU OFF state so as to set the power saving mode.

Transition of Power Mode Upon Performing Copying Operation

FIG. 6 illustrates a transition state of the power mode when performing a copying operation.

As in the reception of FAX data or print job data, when performing a copying operation, the transition of the power mode in the individual units from when the image forming apparatus 1 is started after power is supplied from the power supply unit 9 via the power line 11 until when the image forming apparatus 1 shifts to the power saving mode is similar to that in the case of FAX reception shown in FIG. 4 or that in case of the reception of print job data shown in FIG. 5.

After shifting to the power saving mode, as shown in FIG. 6, when a document is set on the auto document feeder (ADF) provided in the image reading unit 3 or when the platen cover that covers the platen glass is opened and closed (detection of a document), the image reading unit 3 shifts to the power ON (5 V) state. Then, the image reading controller 93 of the image reading unit 3 sends by broadcasting a command indicating that a document has been set (document detection command) to the other units via the internal LAN 10.

Upon receiving the document detection command via the internal LAN 10 by broadcasting, the individual units determine on their own to set the power modes.

More specifically, in the UI unit 4, upon receiving the document detection command from the image reading unit 3, the UI unit 4 shifts from the power OFF state to the power ON (24 V) state. This turns ON the UI controller 94 and the mechanism system of the UI unit 4 so as to wait for a user to depress a copy start button (start button).

In the system control unit 8, upon receiving the document detection command from the image reading unit 3, the above-described ASIC provided for the system control unit 8 shifts the system control unit controller 98 from the CPU OFF state to the power ON (5 V) state. Then, the system control unit 8 waits for a copying operation to start.

In contrast, it is not necessary that the FAX unit 5 perform an operation in response to the document detection command from the image reading unit 3. Accordingly, the FAX unit 5 maintains the power mode in the power OFF state.

It is also not necessary that the image forming unit 2 perform an operation when receiving the document detection command. Accordingly, the image forming unit 2 maintains the power mode in the power OFF state. Although it is not shown in FIG. 6, the same applies to the feeder unit 6.

Subsequently, when the user has depressed the start button of the UI unit 4, the UI unit 4 sends by broadcasting a command indicating that the start button has been depressed (button depression command) to the other units via the internal LAN 10.

In the system control unit 8, upon receiving the button depression command from the UI unit 4, the system control unit controller 98 shifts the power mode from the power ON (5 V) state to the power ON (24 V) state, thereby turning ON the mechanism system of the system control unit 8. Then, the system control unit controller 98 sends by broadcasting a command (job start command) to start a copying processing (job) to the other units via the internal LAN 10.

Upon receiving the job start command from the system control unit 8, the image forming unit 2 shifts the power mode from the power OFF state to the power ON (24 V) state, thereby turning ON the mechanism system 23 (see FIG. 3) of the image forming unit 2 to start the image forming pre-operation (starting the job). More specifically, a warm-up operation for setting up a fixing device included in the mechanism system 23 to be ready for a fixing operation is started. Upon completion of the warm-up operation of the fixing device, the image forming controller 92 sends by broadcasting a command indicating that the warm-up operation has finished (warm-up completion notification command) to the other units via the internal LAN 10.

In the image reading unit 3, upon receiving the job start command from the system control unit 8, the image reading controller 93 shifts the image reading unit 3 from the power ON (5 V) state to the power ON (24 V) state, thereby turning ON the mechanism system of the image reading unit 3. The image reading controller 93 then waits for the warm-up completion notification command from the image forming unit 2.

Then, in the image reading unit 3, upon receiving the warm-up completion notification command from the image reading unit 2, the image reading controller 93 starts reading a document. The image reading controller 93 also sends by broadcasting a command indicating that reading of the document has started (document read start command) to the other units via the internal LAN 10.

In the system control unit 8, upon receiving the document read start command from the image reading unit 3, the system control unit controller 98 starts storing the image data sent from the image reading unit 3. When a predetermined amount of image data is stored, the system control unit controller 98 transfers the stored image data to the image forming unit 2.

The image forming unit 2 then starts image forming (printing) on the basis of the image data obtained from the system control unit 8.

Although it is not shown in FIG. 6, the feeder unit 6 also starts an operation for feeding paper after a procedure similar to that described above.

In this case, the image forming controller 92 and the feeder controller 96 of the feeder unit 6 send by broadcasting a command indicating that the image forming operation has started (image forming start notification command) to the other units via the internal LAN 10.

In the image forming unit 2 or in the feeder unit 6 that has started printing, the various controllers 22 provided for the image forming unit 2 or the feeder controller 96 provided for the feeder unit 6 may respectively determine and control as to whether power is to be supplied or stopped (ON or OFF) for the devices (mechanism system 23) forming the image forming unit 2 or for the devices forming the feeder unit 6 and may also determine and control the power modes (ON or OFF) of the controllers.

Referring back to the image reading unit 3, upon completion of reading the document by the image reading unit 3, the image reading controller 93 shifts the power mode of the image reading unit 3 from the power ON (24 V) state to the power ON (5 V) state, thereby turning OFF power supplied to the mechanism system of the image reading unit 3. However, the image reading controller 93 maintains its operating state (5 V) for a predetermined period in order to wait for a subsequent document to be read. The image reading controller 93 also sends by broadcasting a command indicating that reading of the document has finished (reading completion notification command) to the other units via the internal LAN 10.

In the system control unit 8, upon receiving the reading completion notification command from the image reading unit 3, the system control unit controller 98 identifies the reading completion notification command from the image reading unit 3 so as to finish storing the image data from the image reading unit 3. However, the system control unit 8 is still required to continue transferring the stored data to the image forming unit 2. The system control unit 8 has also identified the image forming start notification command from the image forming unit 2 and the feeder unit 6 that the image forming operation is being performed in the image forming unit 2 and the feeder unit 6. Accordingly, the system control unit controller 98 maintains the power ON (24 V) state in order to transfer the stored image data and to monitor the operation of the entire image forming apparatus 1.

Upon completion of printing by the image forming unit 2, the image forming controller 92 shifts the power mode of the image forming unit 2 from the power ON (24 V) state to the power ON (5 V) state, thereby turning OFF power supplied to the mechanism system 23 of the image forming unit 2. However, the image forming controller 92 maintains its operating state (5 V) for a predetermined period in order to receive various image data including subsequent image data from the image reading unit 3. The image forming controller 92 also sends by broadcasting a command indicating that printing has finished (image forming completion notification command) to the other units via the internal LAN 10. Then, if image data is not input after the lapse of a predetermined time, power to the image forming controller 92 is turned OFF, and the image forming unit 2 shifts to the power OFF state.

Although it is not shown in FIG. 6, the same applies to the feeder unit 6.

In the system control unit 8, upon receiving the image forming completion notification command from the image forming unit 2, the system control unit controller 98 maintains the power ON (24 V) state for a predetermined period, and then shifts to the power ON (5 V) state, thereby turning OFF power supplied to the mechanism system of the system control unit 8. However, the system control unit controller 98 maintains its operating state (5 V) for a predetermined period in order to wait for an input of a command received by broadcasting from any of the individual units via the internal LAN 10. If no command is input from any of the units after the lapse of a predetermined time, the system control unit 8 determines that no image information (various image data) is input into the image forming apparatus 1. Thus, the system control unit controller 98 shifts to the CPU OFF state so as to set the power saving mode.

As described above, in the image forming apparatus 1 of this exemplary embodiment, in each of the cases where FAX data is received, print job data is received, a copying operation is performed, the image forming function and the control functions individually determine their system states or the lapse of a predetermined time so as to change the power mode. More specifically, the image forming controller 92, the image reading controller 93, the UI controller 94, the FAX controller 95, the feeder controller 96, the memory controller 97, and the system control unit controller 98 individually determine whether power is supplied or stopped (ON or OFF) for the corresponding controllers from information to which a command has been appended obtained via the internal LAN 10 so as to control on their own as to whether power from the power supply unit 9 is to be supplied or stopped. Thus, power is supplied to the image forming function and the control functions in accordance with appropriate times. As a result, power saving can be achieved in each unit.

In this case, the various controllers provided in each unit may also control on their own as to whether power is to be supplied or stopped for the corresponding controllers and the corresponding devices in accordance with corresponding operation times. Thus, power is supplied to the various controllers and the corresponding devices in accordance with appropriate times. As a result, power saving can be achieved in each device.

Figure 7:
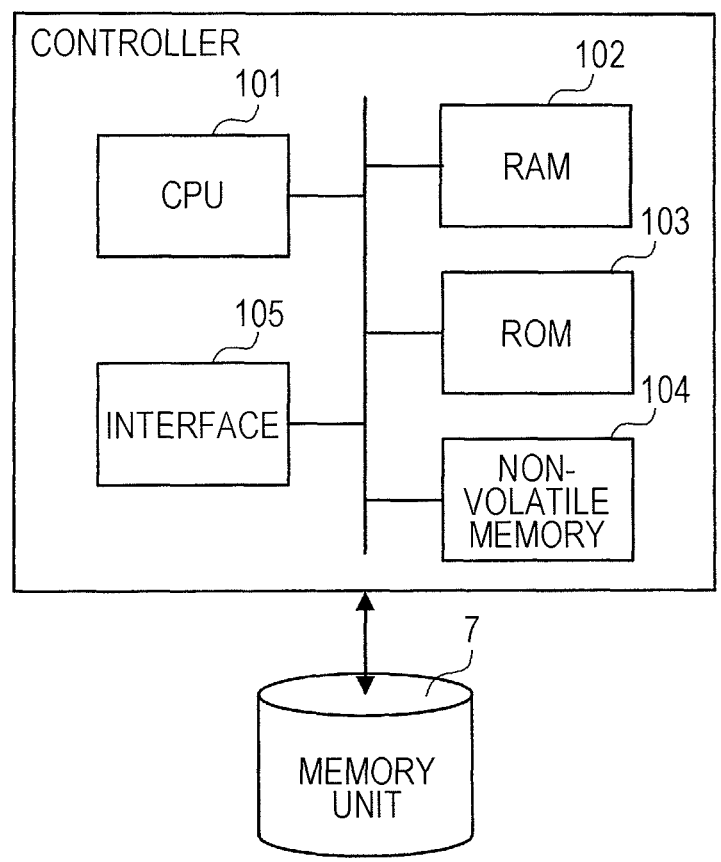
FIG. 7 illustrates a hardware configuration of a controller of one of an image forming function and various control functions.

FIG. 7 illustrates a hardware configuration of the image forming controller 92, the image reading controller 93, the UI controller 94, the FAX controller 95, the feeder controller 96, the memory controller 97, or the system control unit controller 98 of the image forming unit 2, the image reading unit 3, the UI unit 4, the FAX unit 5, the feeder unit 6, the memory unit 7, or the system control unit 8, respectively, which serves as the image forming function or the control function. It is noted that the controller shown in FIG. 7 is one of the above-described controllers. The controller shown in FIG. 7 includes a CPU 101, a RAM 102, a ROM 103, a non-volatile memory 104, and an interface 105. The CPU 101 serves as an example of a calculation unit that executes digital calculation processing in accordance with a predetermined program when controlling the transition of the power mode of the image forming function or the control function. The RAM 102 stores therein programs, etc. executed by the CPU 101. The ROM 103 stores therein data, such as setting values used for the programs executed by the CPU 101. The non-volatile memory 104 is, for example, an EEPROM or a flash memory, which is rewritable and can retain data even after power is OFF. The interface 105 controls input/output of signals into or from devices which are connected to the controller.

The memory unit 7 stores therein processing programs executed by the corresponding controllers. Each controller reads a corresponding processing program from the memory unit 7 so as to execute control processing for the power mode of the image forming function or the control function. That is, a program for executing control processing for the power mode of the image forming function or the control function is read from a hard disk or a digital versatile disk (DVD)-ROM, which is the memory unit 7, into the RAM 102 within the controller. Then, on the basis of the program read into the RAM 102, the CPU 101 executes various types of processing. The provision of the program is not restricted to the mode described above. For example, the program may be stored in the ROM 103 in advance and may be loaded into the RAM 102. Alternatively, if the ROM 103 is a rewritable storage device, such as an EEPROM, the program may be installed into the ROM 103 and may be loaded into the RAM 102 after setting the controller. The program may be transmitted to the controller via the external LAN 12, such as the Internet, and may be installed in the ROM 103 and loaded into the RAM 102.

As described above, in the image forming apparatus 1 of this exemplary embodiment, when performing various image processing operations, the image forming function and the various controllers individually determine on their own their system states or the lapse of a predetermined time so as to change the power modes. With this configuration, power is supplied to the image forming function and the various control functions in accordance with appropriate operation times. As a result, power saving can be achieved in each unit.

In this case, the various controllers provided in each unit may also control on their own as to whether power is to be supplied or stopped for the corresponding controllers and the corresponding devices in accordance with corresponding operation times. Thus, power is supplied to the various controllers and the corresponding devices in accordance with appropriate times. As a result, power saving can be achieved in each device.

A first exemplary embodiment and a second exemplary embodiment will now be described below with reference to the drawings.

First Exemplary Embodiment

Figure 8:
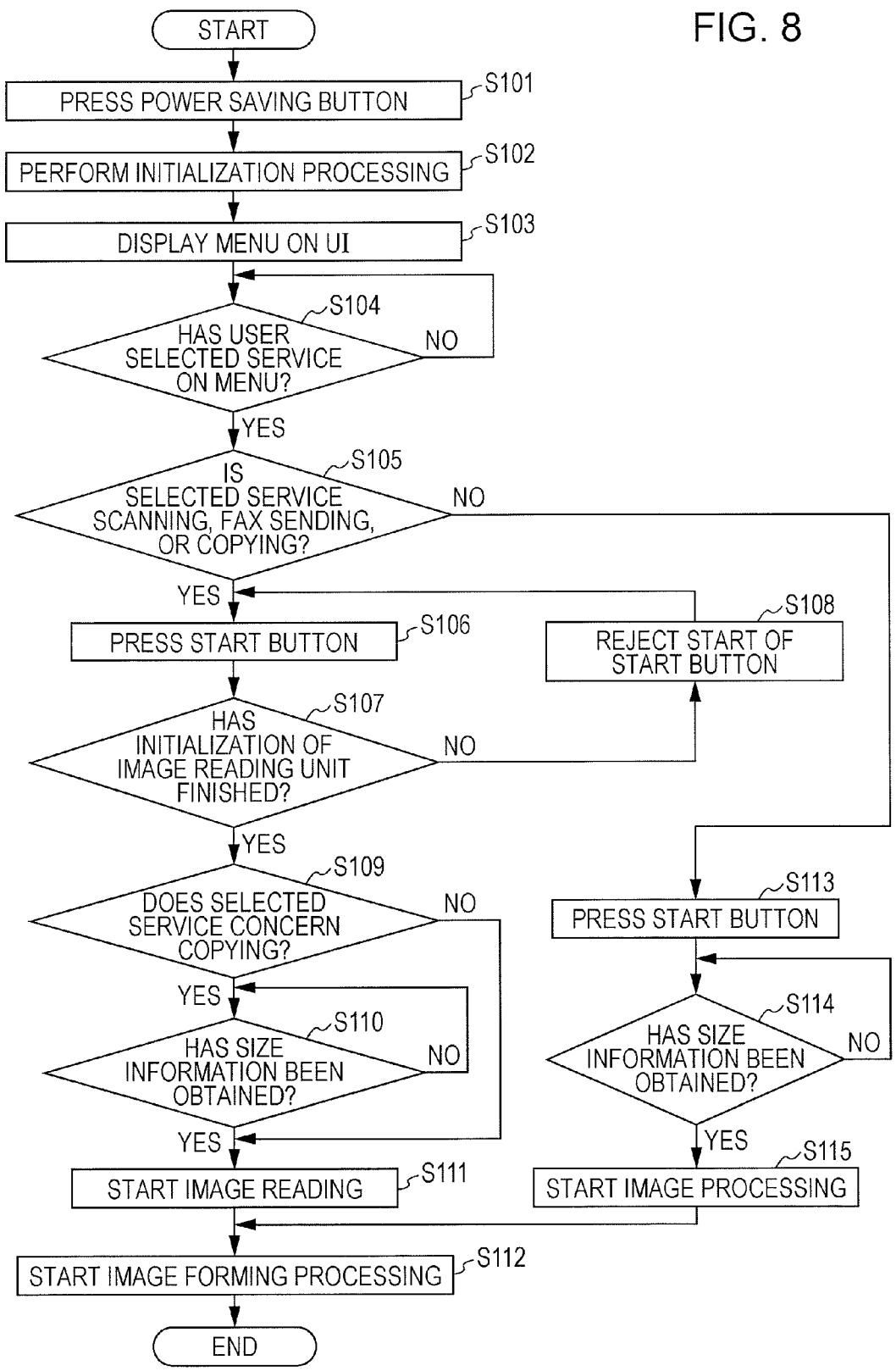
FIG. 8 is a flowchart illustrating an example of control processing according to a first exemplary embodiment.

FIG. 8 is a flowchart illustrating an example of control processing according to the first exemplary embodiment.

Details of the control processing shown in FIG. 8 will be discussed below. In step S101, it is detected that the power saving button 140 (see FIG. 1) of the UI unit 4 has been pressed in the power saving mode. Then, in step S102, the image forming unit 2, the image reading unit 3, and the UI unit 4 each perform initialization processing. Upon completing the initialization processing of the UI unit 4, in step S103, display processing on the UI unit 4 is started. A menu screen to be displayed on the UI unit 4 is drawn, and when the UI unit 4 has entered the standby mode, the menu screen is displayed. It is then determined in step S104 whether a user has made a selection on the menu. In the menu screen, buttons for selecting various services, such as "copy (document copy)", "print", "FAX reception", "FAX sending", and "scan", are displayed.

In this manner, the user can select various services on the menu screen of the UI unit 4 not long after pressing the power saving button 140. When display of the menu screen on the UI unit 4 has started, the image forming unit 2 and the image reading unit 3 have not finished initialization processing, and thus, they are not in the standby mode. Accordingly, images are displayed on the UI unit 4 while parameters for the individual units have not been set. Thus, the UI unit 4 performs the following control. The UI unit 4 reads various parameters which have been stored in the memory unit 7 before shifting to the power saving mode and temporarily displays images by use of the read parameters. Then, when each parameter is set, the UI unit 4 changes the display content accordingly.

If it is determined in step S104 that the user has selected one of the services on the menu screen, the process proceeds to step S105 to determine which service has been selected. More specifically, it is determined in step S105 whether the selected service is scanning, FAX sending, or copying. If the result of step S105 is YES, the process proceeds to step S106. If the result of step S105 is NO, and more specifically, if a service other than scanning, FAX sending, and copying has been selected, that is, if printing or FAX reception has been selected, the process proceeds to step S113.

The determination made in step S105 means to determine whether it is necessary to start the image reading unit 3 in order to execute the service selected on the menu screen. That is, services, such as scanning, FAX sending, and copying require the operation of the image reading unit 3, while services, such as printing and FAX reception, do not require the operation of the image reading unit 3. Additionally, services, such as scanning and FAX sending do not require the operation of the image forming unit 2, while services, such as copying, printing, and FAX reception require the operation of the image forming unit 2.

If it is determined in step S105 that the selected service is scanning, FAX sending, or copying, the process proceeds to step S106. In step S106, the start button 180 (see FIG. 1 or 2) is pressed. It is then determined in step S107 whether the image reading unit 3 has finished initialization processing. If the result of step S107 is NO, the process proceeds to step S108 in which the operation of the start button 180 is rejected. The process then returns to step S106. The reason for rejecting the operation of the start button 180 in step S108 is as follows. A document size cannot be detected until initialization of the image reading unit 3 has finished. In other words, the reception of the start button 180 is not started until initialization of the image reading unit 3 has finished.

A determination as to whether initialization of the image reading unit 3 has finished may be made by determining whether all the functions or some of the functions of the image reading unit 3 have been initialized. Some of the functions of the image reading unit 3 include, for example, a document size detection function of detecting the size of the outer configuration of a document which is to be read by the image reading unit 3.

If it is determined in step S107 that the image reading unit 3 has finished initialization processing, the process proceeds to step S109 to determine whether the selected service concerns copying.

More specifically, if it is determined in step S109 that the selected service concerns copying, the process proceeds to step S110 to determine whether information concerning the size of paper (size information) set in the paper tray 160 shown in FIG. 2 has been set. If the size information has not been set, the process returns to step S110 and waits until the size information has been set. This size information refers to information for specifying the size of paper contained in the paper tray 160 of the feeder unit 6, as discussed above.

If it is determined in step S110 that the size information has been set, the process proceeds to step S111 in which reading of an image is started. Then, in step S112, image forming processing is started.

If it is determined in step S109 that the selected service does not concern copying, the process proceeds to step S111.

In this manner, the execution of a service, such as scanning, FAX sending, or copying, is started and a series of this processing has completed.

If it is determined in step S105 that the selected service does not concern scanning, FAX sending, or copying, that is, if the selected service is printing or FAX reception, the process proceeds to step S113 in which the start button 180 is pressed. Then, it is determined in step S114 whether information concerning the size of paper set in the paper tray 160 has been obtained. This determination is the same as the determination made in step S110.

If it is determined in step S114 that the size information has been set, the process proceeds to step S115 in which image processing is started. The process further proceeds to step S112 in which the image forming processing is started.

In this manner, the execution of a service concerning printing or FAX reception has started, and a series of this processing has completed.

Setting of size information in step S110 or S114 may be performed by reading the size information which has been stored in the memory unit 7 in advance before the image processing apparatus 1 has entered the power saving mode.

Figure 9:
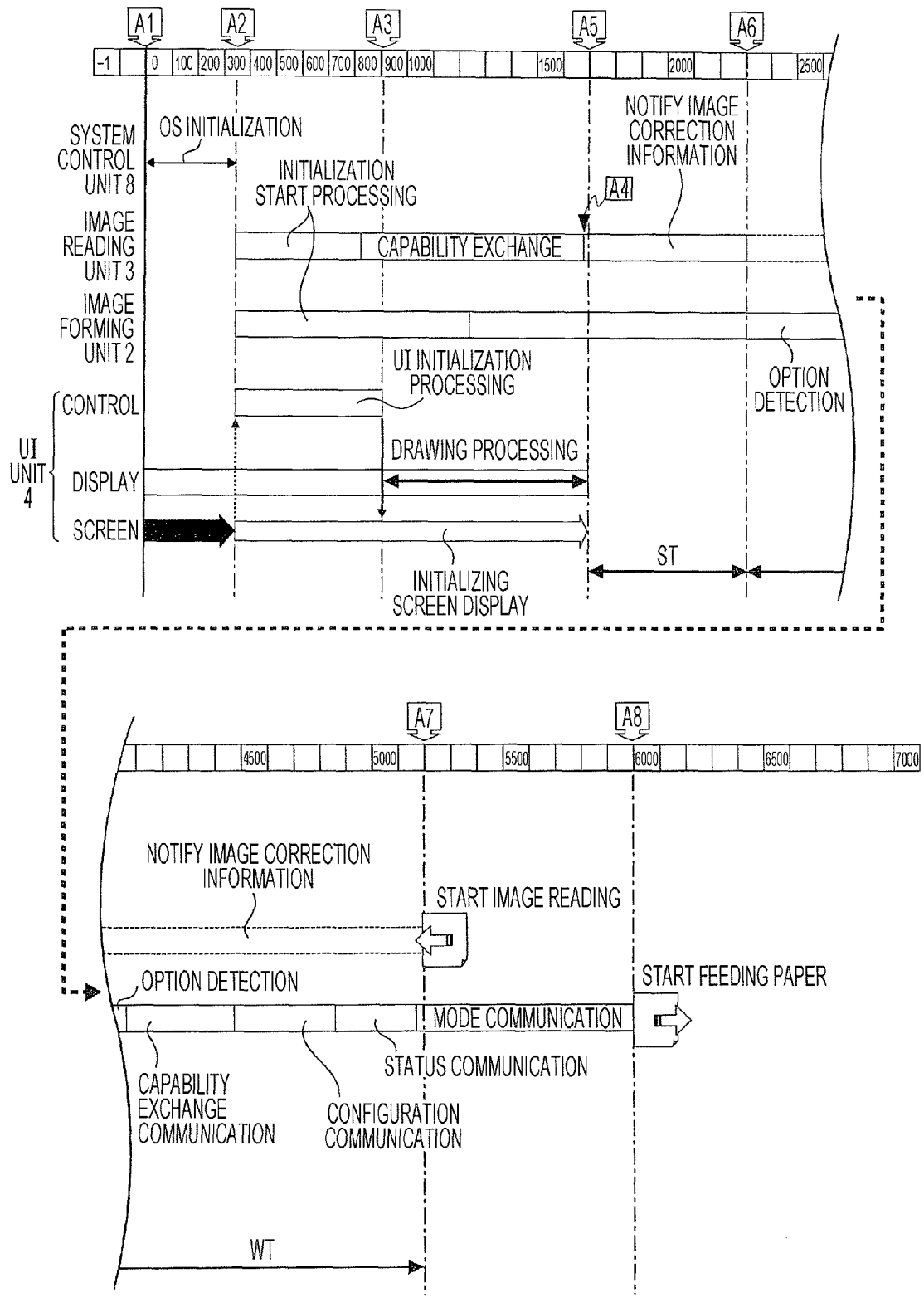
FIG. 9 is a timing chart illustrating an example of control processing according to the first exemplary embodiment.

FIG. 9 is a timing chart illustrating an example of control processing for copying a document according to the first exemplary embodiment. In FIG. 9, in the order from the left to the right of the horizontal axis, "pressing power saving button to cancel power saving" A1, "system power saving canceling processing" A2, "start of UI display" A3, "time when document size can be detected" A4, "UI standby" A5, "image reading standby" A6, "setting state of tray" A7, and "image forming standby" A8 are shown.

When the power saving mode is canceled by pressing the power saving button 140, as indicated by "pressing power saving button to cancel power saving" A1, the system control unit 8 initializes an operating system (OS), and then, the image reading unit 3, the image forming unit 2, and the UI unit 4 also perform initialization.

As described above, after the power saving mode has been canceled, the UI unit 4 resumes the standby mode without being synchronized with the other units. More specifically, upon completion of initialization processing, the UI unit 4 starts drawing processing, and an initializing screen is displayed while the drawing processing is being executed. After completing the drawing processing, a start-button operation prohibition period ST is set. More specifically, after a time when the document size can be detected is started, the operation of the start button is prohibited. That is, even if a copy service is selected and the corresponding screen is displayed, the operation of the start button 180 is not accepted until the image reading unit 3 has been initialized and entered the standby mode. In other words, the period from when the UI unit 4 has entered the standby mode indicated by "UI standby" A5 until when the image reading unit 3 has entered the standby mode indicated by "image reading standby" A6 is set as the start-button operation prohibition period (start prohibition period) ST.

Alternatively, the period from when the UI unit 4 has entered the standby mode indicated by "UI standby" A5 until when initialization of the image reading unit 3 has completed may be set as the start-button operation prohibition period ST.

In the example of the control processing shown in FIG. 9, when the image reading unit 3 shifts to the standby mode after performing initialization processing and capability exchange, the start-button operation prohibition period is canceled, and then, the image processing apparatus 1 waits for size information to be set.

More specifically, in the wait period WT from when the image reading unit 3 has entered the standby mode and an operation of the start button 180 is to be received until when the state of a tray is set, the operation of the start button 180 is accepted, but reading of an image performed by the image reading unit 3 is not started. That is, after "setting state of tray" A7, reading of an image of a document which is set on the platen cover 34 of the image reading unit 3 is started, or the feeding of a document which is set in the auto document feeder (ADF) 32 is started. In this manner, reading of a document image performed by the image reading unit 3 is started when the size information has been set and the state of the tray has been set.

Meanwhile, in the image forming unit 2, initialization processing is started, options are detected, and capability exchange communication is performed with the detected options. At the same time, configuration communication, status communication, and mode communication are performed. Then, the image forming unit 2 enters the standby mode, and the feeding of paper is started.

If the configuration of the detected options is different from that before the image forming unit 2 has entered the power saving mode, the entire image forming apparatus 1 may be restarted as a fail-safe.

Figure 10:
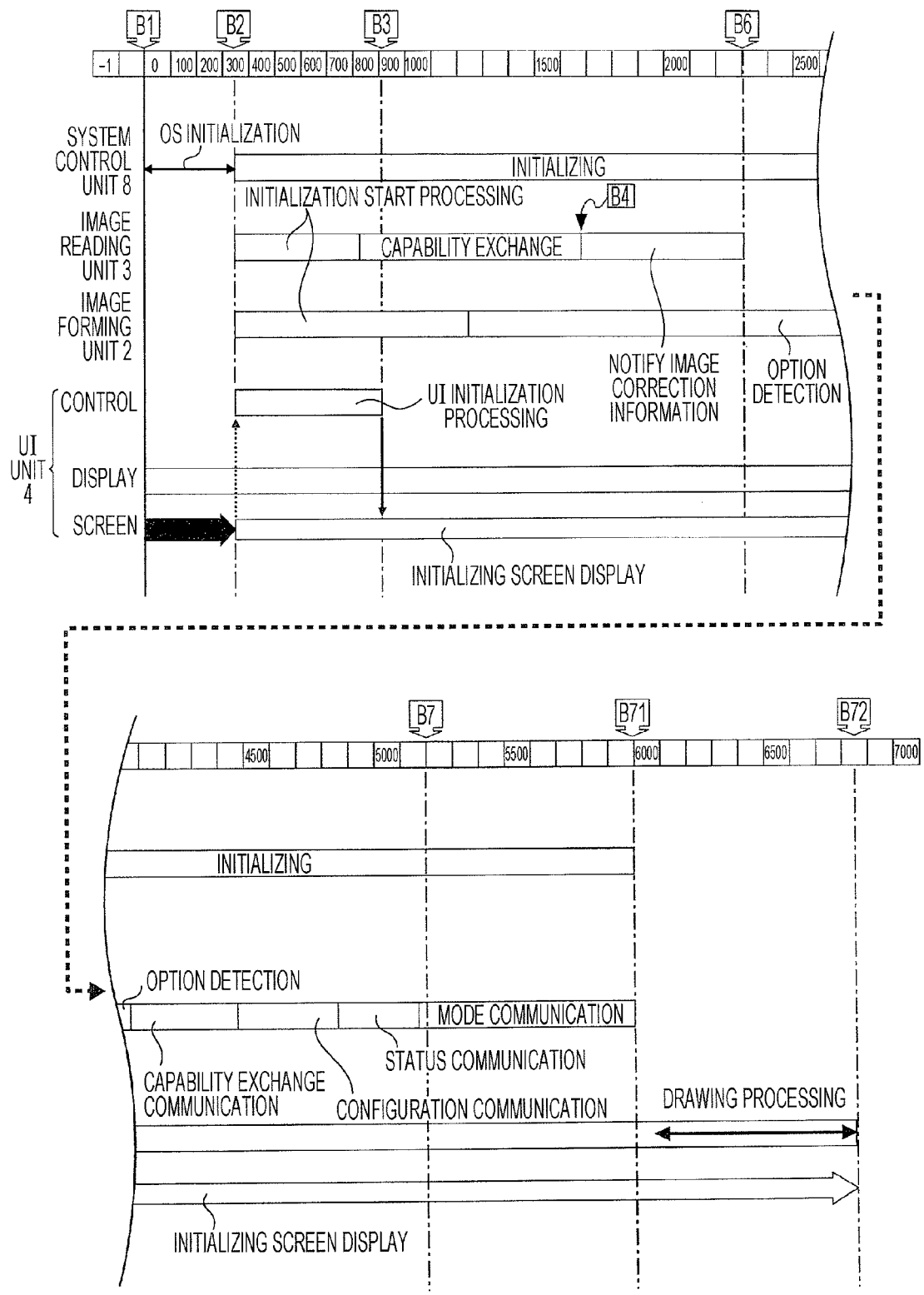
FIG. 10 is a timing chart illustrating an example of control processing according to an example of the related art.

FIG. 10 is a timing chart illustrating an example of control processing for copying a document according to an example of the related art, which is shown as a comparative example. FIG. 10 corresponds to FIG. 9. In FIG. 10, in the order from the left to the right of the horizontal axis, "pressing power saving button to cancel power saving" B1, "start initialization processing" B2, "start of UI display" B3, "time when document size can be detected" B4, "image reading standby" B6, "setting state of tray" B7, "image reading standby/UI standby/system power saving canceling processing" B71, and "display of UI menu" B72 are shown.

As shown in FIG. 10, when the power saving mode is canceled by pressing the power saving button 140, as indicated by B1, the system control unit 8 initializes the OS, and then, the image reading unit 3, the image forming unit 2, and the UI unit 4 also perform initialization. In the UI unit 4, upon completion of the initialization processing, display processing is started. During this initialization processing, the size of a document can be detected. Then, the image reading unit 3 finishes initialization processing, and the state of the tray is set. Then, the image forming unit 2 enters the standby mode, and all the units finish initialization processing. Then, the system control unit 8 finishes power saving processing, as indicated by B71. The UI unit 4 also enters the standby mode, and a menu screen of the UI unit 4 is drawn and displayed. After displaying this menu screen, as indicated by B72, the user is ready to select a service so as to execute processing corresponding to the selected service.

The second exemplary embodiment is now described below. In the second exemplary embodiment, elements having the same configurations and functions as those of the first exemplary embodiment are designated by like reference numerals, and an explanation and representation thereof in the drawing may be omitted.

Second Exemplary Embodiment

Figure 11:
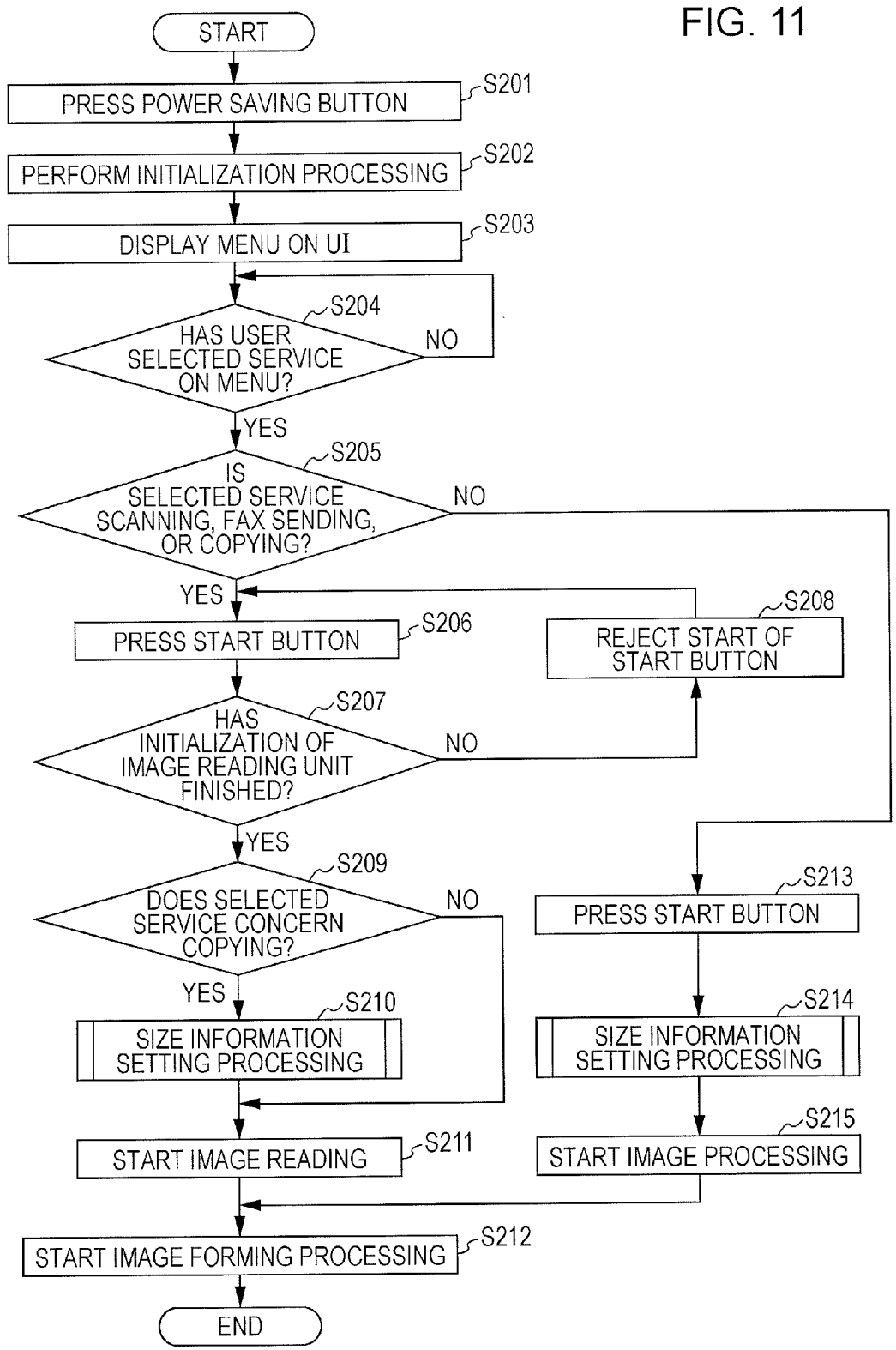
FIG. 11 is a flowchart illustrating an example of control processing according to a second exemplary embodiment.
Figure 12:
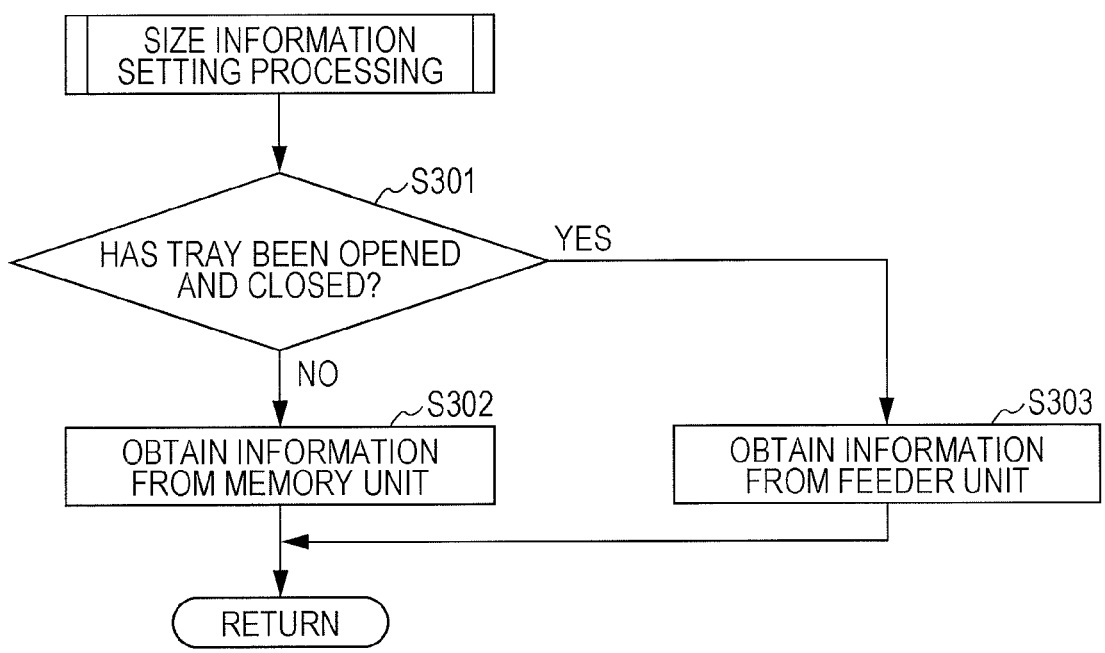
FIG. 12 is a flowchart illustrating an example of control processing according to the second exemplary embodiment.

FIGS. 11 and 12 are flowcharts illustrating an example of control processing according to the second exemplary embodiment. FIGS. 11 and 12 correspond to FIG. 8 illustrating the first exemplary embodiment. In FIG. 11, the same steps as those of FIG. 8 are designated by like step numbers, and an explanation thereof may thus be omitted. That is, steps S201 through S209, S211 through S213, and S215 correspond to steps S101 through S109, S111 through S113, and S115, respectively, of FIG. 8, and thus, size information setting processing in step S210 and S214 will be discussed.

As shown in FIG. 11, if the selected service concerns copying, i.e., if the results of steps S205 and S209 are YES, the process proceeds to step S210 in which size information setting processing is performed. Then, in step S211, reading of an image is started.

In FIG. 11, if the selected service does not concern scanning, FAX sending, or copying, i.e., if the selected service concerns printing or FAX reception, the result of step S205 is NO, and the process proceeds to step S213 in which the start button is pressed. Then, in step S214, size information setting processing is performed, and in step S215, image processing is started. The size information setting processing means to obtain information concerning the size of paper set in the paper tray 160, and a specific process thereof is shown in FIG. 12. As described above, the size information is information for specifying the size of paper contained in the paper tray 160 of the feeder unit 6.

As shown in FIG. 12, in the size information setting processing, it is determined in step S301 whether the tray has been opened and closed. This determination is made by using a sensor (not shown) to determine whether an operation for changing the size of paper in the paper tray 160 (see FIG. 2) has been performed. It is noted that opening and closing of the tray is just an example for changing the size of paper.

If it is determined in step S301 that the tray has not been opened or closed, the process proceeds to step S302. In step S302, before obtaining size information from the feeder unit 6, the size information which has been stored in the memory unit 7 before the image forming apparatus 1 has entered the power saving mode is read out from the memory unit 7. In this manner, if it is determined that the tray has not been opened or closed, the size information stored in the memory unit 7 is obtained without waiting for the size information to be sent from the feeder unit 6. Size information setting processing has thus completed.

In contrast, if it is determined in step S301 that the tray has been opened and closed, the process proceeds to step S303. In step S303, the process waits for size information to be sent from the feeder unit 6 without reading size information from the memory unit 7. Upon receiving the size information from the feeder unit 6, information concerning the actual size of paper set in the paper tray 160 can be obtained.

As described above, according to the first and second exemplary embodiments, unlike the comparative example, the time until the user is able to start operating a menu on the UI unit 4 is significantly decreased, and accordingly, the time until the execution of a service selected by the user is started can also be decreased, thereby enabling the user to obtain an output quickly. Additionally, after information concerning the paper in the tray has been set, image forming processing is performed simultaneously with image reading and the result is stored in the memory unit 7. Thus, with an inexpensive hardware configuration, output processing can be performed while fast reading is being performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an apparatus body that implements a plurality of functions in accordance with operations requested by a user by using an operation unit, the plurality of functions including an image reading function of reading an image of a document, an image information provided for the user;

a controller that controls a first power state, a second power state, and a third power state, the first power state being a state in which one of the plurality of functions is being performed, the second power state being a state in which one of the plurality of functions is ready to be performed, the third power state being a state in which there is no power to perform any of the plurality of functions or the third power state being a state in which power is lower than power in the first power state or the second power state;

an obtaining unit that obtains information concerning paper to be supplied when the image forming function is implemented in the apparatus body;

a first control unit that controls the plurality of functions so that, when the plurality of functions are to be returned from the third power state to the second power state, the display function is returned to the second power state without being synchronized with the functions other than the display function and an operation requested by the user by using the operation unit of the apparatus body is received before the functions other than the display function are returned to the second power state; and a second control unit that controls the functions other than the display function so that, if the image forming function is required for executing an operation which has been requested by the user by using the operation unit and which has been received under the control of the first control unit, the operation is executed after the obtaining unit obtains the information concerning paper, wherein the second control unit performs control so that, if the image forming function is not required for executing an operation which has been requested by the user by using the operation unit and which has been received under the control of the first control unit, the operation is executed without waiting for the information concerning paper to be obtained by the obtaining unit, wherein the second control unit performs control so that, when a document is to be copied by the image reading function and the image forming function of the plurality of functions, the image reading function does not shift to the first power state until the information concerning paper is obtained by the obtaining unit, wherein the information concerning paper comprises size information about the paper, and wherein when the operation which has been requested by the user by using the operation unit is not scanning, fax sending or copying, the first control unit performs control so that the operation is not started until the information concerning paper is obtained by the obtaining unit.

2. The image forming apparatus according to claim 1, wherein the first control unit performs control so that an instruction to start an execution of an operation requested by the user by using the operation unit is not received until a size of the document is ready to be detected by the image reading function.

3. The image forming apparatus according to claim 1, wherein the second control unit performs control so that, if no operation has been performed on a paper feeding unit before the plurality of functions are returned from the third power state when a document is to be copied by the image reading function and the image forming function, the image reading function is shifted to the third power state before the obtaining unit obtains the information concerning the paper from the paper feeding unit.

4. The image forming apparatus according to claim 3, further comprising:

an information storage unit that stores therein information utilized when implementing the plurality of functions, wherein the display function displays the information concerning the plurality of functions stored in the information storage unit, and if information which has been set is different from the information stored in the information storage unit, the display function changes the information stored in the storage unit to the information which has been set and displays the information which has been set.

5. An image forming apparatus comprising:

an apparatus body that implements a plurality of functions in accordance with operations requested by a user by using an operation unit, the plurality of functions including an image reading function of reading an image of a document, an image forming function of forming an image, and a display function of displaying content of information provided for the user;

a controller that controls a first power state, a second power state, and a third power state, the first power state being a state in which one of the plurality of functions is being performed, the second power state being a state in which one of the plurality of functions is ready to be performed, the third power state being a state in which there is no power to perform any of the plurality of functions or the third power state being a state in which power is lower than power in the first power state or the second power state;

an obtaining unit that obtains information concerning paper to be supplied when the image forming function is implemented in the apparatus body;

a first control unit that controls the plurality of functions so that, when the plurality of functions are to be returned from the third power state to the second power state, the display function is returned to the second power state without being synchronized with the functions other than the display function and an operation requested by the user by using the operation unit of the apparatus body is received before the functions other than the display function are returned to the second power state; and a second control unit that controls the functions other than the display function so that, if the image forming function is not required for executing an operation which has been requested by the user by using the operation unit and which has been received under the control of the first control unit, the operation is executed without waiting for the information concerning paper to be obtained by the obtaining unit, wherein the second control unit performs control so that, when a document is to be copied by the image reading function and the image forming function of the plurality of functions, the image reading function does not shift to the first power state until the information concerning paper is obtained by the obtaining unit, wherein the information concerning paper comprises size information about the paper, and wherein when the operation which has been requested by the user by using the operation unit is not scanning, fax sending or copying, the first control unit performs control so that the operation is not started until the information concerning paper is obtained by the obtaining unit.

6. The image forming apparatus according to claim 5, wherein the first control unit performs control so that an instruction to start an execution of an operation requested by the user by using the operation unit is not received until a size of the document is ready to be detected by the image reading function.

7. A non-transitory computer readable medium storing a program causing a computer to execute a process, the computer being provided in an image forming apparatus that implements a plurality of functions by an operation requested by a user by using an operation unit, the plurality of functions including an image reading function of reading an image of a document, an image forming function of forming an image, and a display function of displaying content of information provided for the user, the process comprising:

controlling a first power state, a second power state, and a third power state, the first power state being a state in which one of the plurality of functions is being performed, the second power state being a state in which one of the plurality of functions is ready to be performed, the third power state being a state in which there is no power to perform any of the plurality of functions or the third power state being a state in which power is lower than power in the first power state or the second power state;

obtaining information concerning paper to be supplied when the image forming function is implemented in the image forming apparatus;

controlling the plurality of functions so that, when the plurality of functions are to be returned from the third power state to the second power state, the display function is returned to the second power state without being synchronized with the functions other than the display function and an operation requested by the user by using the operation unit is received before the functions other than the display function are returned to the second power state; and controlling the functions other than the display function so that, if the image forming function is required for executing an operation which has been requested by the user by using the operation unit, the operation is executed after the information concerning paper is obtained, wherein the controlling the functions other than the display function further comprises, if the image forming function is not required for executing an operation which has been requested by the user by using the operation unit, the operation is executed without waiting for the information concerning paper to be obtained, wherein the controlling the functions other than the display function further comprises, when a document is to be copied by the image reading function and the image forming function of the plurality of functions, the image reading function does not shift to the first power state until the information concerning paper is obtained by the obtaining unit, wherein the information concerning paper comprises size information about the paper, and wherein the controlling the plurality of functions comprises controlling so that when the operation which has been requested by the user by using the operation unit is not scanning, fax sending or copying, the controlling controls so that the operation is not started until the information concerning paper is obtained by the obtaining unit.

8. A method for controlling an image processing apparatus, the method comprising:

receiving a first input to recover from a power saving mode, the first input corresponding to at least one of an image forming function and an image scanning function;

controlling a display function from among a plurality of functions to recover the display function from the power saving mode while maintaining functions, other than the display function, of the plurality of functions in the power saving mode;

receiving first information corresponding to the functions, other than the display function, of the plurality of functions; and controlling another function, corresponding to the first information, of the plurality of functions to recover the other function from the power saving mode in response to the first information being received; and performing the other function, wherein the controlling another function further comprises, when a document is to be copied by the image reading function or scanned by the image scanning function of the plurality of functions, the image reading function and the image forming function do not recover from the power saving mode until the first information is received, wherein the first information comprises information concerning a size of paper, and wherein the controlling another function comprises controlling so that when the other function is not a scanning function, a faxing function or a copying function, the controlling controls so that the other function is not started until the first information the size of paper is received.

* * * * *